(12) United States Patent
Shitamoto et al.

(10) Patent No.: US 8,924,068 B2
(45) Date of Patent: Dec. 30, 2014

(54) AUTONOMOUS MOBILE BODY

(75) Inventors: Hideo Shitamoto, Kyoto (JP); Tsuyoshi Nakano, Kyoto (JP); Shoji Tanaka, Kyoto (JP)

(73) Assignee: Murata Machinery, Ltd., Kyoto (JP)

( * ) Notice: Subject to any disclaimer, the term of this patent is extended or adjusted under 35 U.S.C. 154(b) by 140 days.

(21) Appl. No.: 13/809,719

(22) PCT Filed: Jun. 2, 2011

(86) PCT No.: PCT/JP2011/003103
§ 371 (c)(1),
(2), (4) Date: Jan. 11, 2013

(87) PCT Pub. No.: WO2012/008085
PCT Pub. Date: Jan. 19, 2012

(65) Prior Publication Data
US 2013/0116880 A1 May 9, 2013

(30) Foreign Application Priority Data
Jul. 13, 2010 (JP) .................................. 2010-159103

(51) Int. Cl.
G05D 1/02 (2006.01)
(52) U.S. Cl.
CPC ............... *G05D 1/024* (2013.01); *G05D 1/0236* (2013.01)
USPC .............................................. 701/25; 701/26
(58) Field of Classification Search
USPC .................................................... 701/25, 26
See application file for complete search history.

(56) References Cited

U.S. PATENT DOCUMENTS

| 5,652,489 | A | 7/1997 | Kawakami |
| 6,393,362 | B1* | 5/2002 | Burns ........................... 701/301 |
| 2006/0095160 | A1 | 5/2006 | Orita et al. |
| 2008/0058987 | A1* | 3/2008 | Ozick et al. ................... 700/250 |
| 2011/0166737 | A1 | 7/2011 | Tanaka et al. |
| 2013/0166134 | A1* | 6/2013 | Shitamoto et al. ............... 701/26 |

FOREIGN PATENT DOCUMENTS

| JP | 63-314621 A | 12/1988 |
| JP | 02-120909 A | 5/1990 |
| JP | 02-300803 A | 12/1990 |

(Continued)

OTHER PUBLICATIONS

Official Communication issued in International Patent Application No. PCT/JP2011/003103, mailed on Jul. 26, 2011.

(Continued)

*Primary Examiner* — Mary Cheung
*Assistant Examiner* — Michael Berns
(74) *Attorney, Agent, or Firm* — Keating & Bennett, LLP

(57) ABSTRACT

An autonomous mobile body includes a storage unit arranged to store a size D2 of the autonomous mobile body, a laser range sensor arranged to acquire obstacle information, an obstacle identification unit arranged to identify, based on the acquired obstacle information, edge points indicating positions of both ends of a region in which an interfering obstacle exists, the both ends being both ends on a plane parallel or substantially parallel to a passage plane in a direction which is perpendicular or substantially perpendicular to a moving target direction of the autonomous mobile body, a direction setting unit arranged to set a pull-off direction based on the size D2 of the autonomous mobile body and the edge points, and a mobile controller arranged and programmed to control the autonomous mobile body to move toward the pull-off direction.

19 Claims, 27 Drawing Sheets

(56) References Cited

FOREIGN PATENT DOCUMENTS

| | | |
|---|---|---|
| JP | 03-044712 A | 2/1991 |
| JP | 08-063229 A | 3/1996 |
| JP | 08-132994 A | 5/1996 |
| JP | 2000-330632 A | 11/2000 |
| JP | 2002-282306 A | 10/2002 |
| JP | 2003-140747 A | 5/2003 |
| JP | 2004-118469 A | 4/2004 |
| JP | 2006-133863 A | 5/2006 |
| JP | 2006-259877 A | 9/2006 |
| JP | 2009-288930 A | 12/2009 |
| JP | 2010-61442 A | 3/2010 |

OTHER PUBLICATIONS

Official Communication issued in corresponding International Application PCT/JP2011/003103, issued on Feb. 12, 2013.

* cited by examiner

AUTONOMOUS MOBILE BODY

BACKGROUND OF THE INVENTION

1. Field of the Invention

The present invention relates to an autonomous mobile body which moves autonomously.

2. Description of the Related Art

Conventionally, an autonomous mobile body which detects an obstacle using a laser range finder, and autonomously moves while avoiding interference with the detected obstacle is known. See, for example, Japanese Patent Application Publication No. 2009-288930. As this type of autonomous mobile body, an autonomous mobile body which moves in a narrow passage so that a person can pass through is described in Japanese Patent Application Publication No. 2003-140747. This autonomous mobile body detects a halt signal when a person touches an installed sensor, and moves to and stops at a halt region that is set at the edge of the passage in advance.

The halt region where the autonomous mobile body described in Japanese Patent Application Publication No. 2003-140747 stops is set within the passage in advance. Nevertheless, for instance, since people continually pass through the passage in hospitals, airport lobbies and the like, it is difficult to secure a halt region in advance. Moreover, for example, since factories or warehouses are often deserted and the layout thereof is sometimes changed according to products or goods present, a significant effort is required to re-set the halt region each time the layout is changed.

SUMMARY OF THE INVENTION

Preferred embodiments of the present invention provide an autonomous mobile body capable of moving by autonomously setting a pull-off direction so that a movable obstacle can pass through safely, without setting a halt region in advance.

An autonomous mobile body according to a preferred embodiment of the present invention is an autonomous mobile body which autonomously moves along a planned path and includes a storage unit arranged to store a size of the autonomous mobile body, an obstacle information acquisition unit arranged to acquire obstacle information of obstacles around the autonomous mobile body, an obstacle identification unit arranged to identify, based on the obstacle information acquired by the obstacle information acquisition unit, positions of both ends of a region in which an obstacle positioned in a moving target direction exists, the both ends being both ends on a plane parallel or substantially parallel to a passage plane in a direction which is perpendicular or substantially perpendicular to the moving target direction, a direction setting unit arranged to set a pull-off direction based on the size of the autonomous mobile body stored in the storage unit and the positions of the both ends identified by the obstacle identification unit, and a mobile controller arranged and programmed to control the autonomous mobile body to move in the pull-off direction set by the direction setting unit.

According to a preferred embodiment of the present invention, obstacle information of obstacles around the autonomous mobile body is acquired, and, based on this obstacle information, the identified positions are both ends of a region in which an obstacle positioned in a moving target direction exists, the both ends being both ends on a plane parallel or substantially parallel to a passage plane in a direction which is perpendicular or substantially perpendicular to the moving target direction. Consequently, the positions of both ends of the region including the obstacle that may become an interference if the autonomous mobile body continues to move forward, is identified. In addition, the autonomous mobile body sets and moves to a pull-off direction based on the positions of both ends of the obstacle and the size of the autonomous mobile body. Consequently, the autonomous mobile body can independently set a pull-off direction without interfering with an obstacle, and move in the set direction. As a result of the autonomous mobile body moving in this pull-off direction, this means that the autonomous mobile body made way for the obstacle, and the obstacle can thereby move forward safely. In other words, the autonomous mobile body can independently set and move in the pull-off direction, without having to set a halt region in advance, so that a movable obstacle can pass through safely.

According to a preferred embodiment of the present invention, preferably, the autonomous mobile body further includes a stop position setting unit arranged to set a stop position in the pull-off direction based on the pull-off direction set by the direction setting unit, and an environmental map, and the mobile controller controls the autonomous mobile body to move to and stop at the stop position set by the stop position setting unit.

According to a preferred embodiment of the present invention, the autonomous mobile body preferably sets a stop position in the pull-off direction based on the pull-off direction and an environmental map, and moves to and stops at the stop position. Consequently, the autonomous mobile body can independently set the stop position at a position that is environmentally suitable; that is, at a position that will not interfere with peripheral obstacles. Accordingly, the autonomous mobile body makes way for the obstacle in the moving target direction, and waits for the obstacle to pass through at the position according to the situation.

According to a preferred embodiment of the present invention, preferably, the mobile controller controls the autonomous mobile body so that the mobile speed becomes slower as a distance between the autonomous mobile body and the stop position becomes shorter.

According to a preferred embodiment of the present invention, the autonomous mobile body preferably can stop safely since its mobile speed becomes lower as the autonomous mobile body approaches the stop position. Moreover, since it will be easier to know that the autonomous mobile body is to be stopped when viewed from the outside, an obstacle such as a person can pass by the autonomous mobile body at ease.

According to a preferred embodiment of the present invention, preferably, the autonomous mobile body further includes an interference distance calculation unit arranged to calculate an interference distance between the obstacle positioned in the pull-off direction and the autonomous mobile body based on the obstacle information, while the autonomous mobile body is moving to the pull-off direction, an estimation unit arranged to estimate a stopping distance required for the autonomous mobile body to stop, and a determination unit arranged to determine whether the autonomous mobile body is to be stopped based on the interference distance calculated by the calculation unit and the stopping distance estimated by the estimation unit, and the mobile controller stops the autonomous mobile body when the determination unit determines that the autonomous mobile body is to be stopped, and continues the control of moving the autonomous mobile body to the pull-off direction when the determination unit determines that the autonomous mobile body is not to be stopped.

According to a preferred embodiment of the present invention, preferably the interference distance between the obstacle positioned in the pull-off direction and the autonomous mobile body is calculated while the autonomous mobile body is moving in the pull-off direction. Consequently, when an obstacle appears in the pull-off direction while the autonomous mobile body is moving in the pull-off direction, the interference distance between that obstacle and the autonomous mobile body is calculated. Moreover, the stopping distance required for the autonomous mobile body to stop is estimated. In addition, the autonomous mobile body determines whether to stop based on the interference distance and the stopping distance, and stops when it determines to stop, and continues moving in the pull-off direction when it determines not to stop. Consequently, since the autonomous mobile body stops when an obstacle appears in the pull-off direction while the autonomous mobile body is moving in the pull-off direction, it is possible to prevent interference with the obstacle.

According to a preferred embodiment of the present invention, preferably, the determination unit determines that the autonomous mobile body is to be stopped when the interference distance is less than a distance obtained by adding a clearance value to the stopping distance, and determines that the autonomous mobile body is not to be stopped when the interference distance is equal to or larger than the distance obtained by adding the clearance value to the stopping distance.

According to a preferred embodiment of the present invention, the autonomous mobile body preferably stops when the interference distance is less than a distance obtained by adding a clearance value to the stopping distance, and continues moving in the pull-off direction when the interference distance is equal to or larger than the distance obtained by adding the clearance value to the stopping distance. Consequently, when there is a possibility that the autonomous mobile body will interfere with the obstacle unless it stops, the autonomous mobile body can stop.

According to a preferred embodiment of the present invention, preferably, the autonomous mobile body further includes an avoidance determination unit that determines, based on the obstacle information, whether an avoidance action of the autonomous mobile body moving forward while avoiding an obstacle positioned in the moving target direction is possible on a passage which is a region where the planned path is set and the autonomous mobile body can move, and the mobile controller controls the autonomous mobile body to perform the avoidance action when the avoidance determination unit determines that the avoidance action is possible, and controls the autonomous mobile body to move in the pull-off direction when the avoidance determination unit determines that the avoidance action is not possible.

According to a preferred embodiment of the present invention, the autonomous mobile body preferably determines whether an avoidance action within the passage is possible, and performs the avoidance action when the avoidance action is possible, and moves toward the pull-off direction when the avoidance action is not possible. Accordingly, since the autonomous mobile body performs the avoidance action, if the avoidance action is possible, when there is an obstacle that may become an interference, the autonomous mobile body can head toward the destination efficiently.

According to a preferred embodiment of the present invention, preferably, the autonomous mobile body further includes a pass point distance calculation unit arranged to calculate a distance between the planned path and a pass point within the passage that has been set to avoid interference with the obstacle existing in the moving target direction, and a clearance identification unit arranged to identify a path clearance within the passage that is a distance that the autonomous mobile body can move from the planned path to a direction which is on the pass point side and which is perpendicular or substantially perpendicular to the path direction, and the avoidance determination unit determines that the avoidance action is possible when the distance calculated by the pass point distance calculation unit is larger than the path clearance identified by the clearance identification unit, and determines that the avoidance action is not possible when the distance calculated by the pass point distance calculation unit is equal to or less than the path clearance identified by the clearance identification unit.

According to a preferred embodiment of the present invention, a distance between the planned path and a pass point within the passage that has been set to avoid interference with the obstacle existing in the moving target direction, preferably is calculated. Moreover, what is identified is a path clearance that is a distance that the autonomous mobile body can move from the planned path to a direction which is on the pass point side and which is perpendicular or substantially perpendicular to the path direction. In addition, the autonomous mobile body determines that the avoidance action is possible when the distance between the pass point and the path is larger than the path clearance, and determines that the avoidance action is not possible when the foregoing distance is equal to or less than the path clearance. Consequently, the autonomous mobile body determines that the avoidance action is possible when the clearance to be used to move to the pass point in order to avoid the obstacle is within the passage, and determines that the avoidance action is not possible when the foregoing clearance is not within the passage. Accordingly, the autonomous mobile body can appropriately and creatively use the avoidance action and the action to pull off and make way according to the situation.

According to a preferred embodiment of the present invention, the mobile controller preferably stops the movement of the autonomous mobile body to the pull-off direction and causes the autonomous mobile body to perform the avoidance action when the avoidance determination unit determines that the avoidance action is possible while the autonomous mobile body is moving to the pull-off direction.

According to a preferred embodiment of the present invention, the autonomous mobile body preferably stops moving in the pull-off direction and starts the avoidance action when it becomes possible to perform the avoidance action while moving in the pull-off direction. Accordingly, even when the autonomous mobile body is moving in the pull-off direction, if the situation changes and it becomes possible to perform the avoidance action, it is possible to start the avoidance action according to such change in situation.

According to a preferred embodiment of the present invention, preferably, the mobile controller controls the autonomous mobile body to standby for a predetermined time after reaching the stop position, and to thereafter once again move along the planned path.

According to a preferred embodiment of the present invention, since the autonomous mobile body preferably stands by for a predetermined time after reaching the stop position, it is possible to create a situation where the obstacle can pass through the passage, and wait for the obstacle to pass through. In addition, since the autonomous mobile body resumes its movement along the original planned path after waiting for a predetermined time, the autonomous mobile body can reach the destination efficiently.

According to various preferred embodiments of the present invention, an autonomous mobile body sets and moves in a pull-off direction without having to set a halt region in advance so that a movable obstacle can pass through safely.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
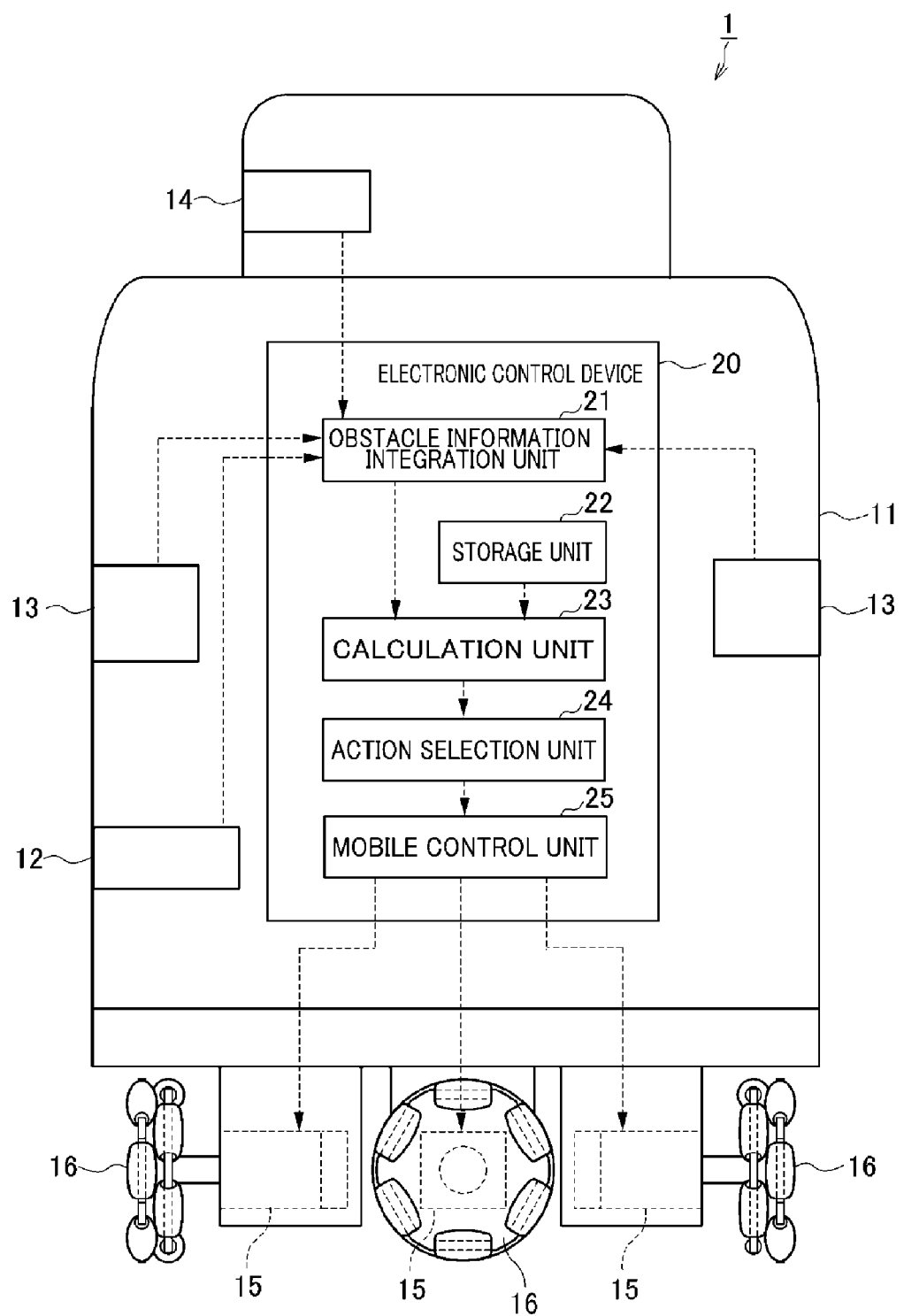
FIG. 1 is a diagram showing the schematic configuration of the autonomous mobile body according to a preferred embodiment of the present invention.

The preferred embodiments of the present invention will now be explained in detail with reference to the drawings. The outline of the autonomous mobile body 1 according to a preferred embodiment of the present invention is foremost explained with reference to FIG. 1. FIG. 1 is a diagram showing the schematic configuration of the autonomous mobile body 1.

The autonomous mobile body 1 according to this preferred embodiment preferably is, for example, a robot which is deployed in facilities such as a hospital or a factory, and independently plans the path to the destination and autonomously moves along the planned path while avoiding obstacles such as walls and pillars. Note that the autonomous mobile body according to the present invention can also be applied to an AGV (Automated Guided Vehicle) or the like, for example. The autonomous mobile body 1 plans the path so as to avoid the known obstacles stored in an environmental map in advance, and, upon moving along the planned path, detects the as-yet-unknown obstacles that it will encounter by using various types of obstacle sensors. When the autonomous mobile body 1 detects an obstacle in the moving target direction by using an obstacle sensor, the autonomous mobile body 1 controls the movement of the autonomous mobile body by independently selecting an avoidance action, a stopping action, or a retreat action in accordance with the circumstances.

Note that the avoidance action is an action of avoiding an obstacle on a passage in which a path is set. The stopping action is an action of stopping movement in the pull-off direction on a passage in which a path is set, and thereby making way for an obstacle. The retreat action is an action of retreating from a passage on which a path is set. Moreover, in this description, the term "pull-off" is used to mean that the autonomous mobile body moves to the edge of the passage and waits for the obstacle to pass by, and, meanwhile, the term "retreat" is used to mean that the autonomous mobile body pulls back from the passage.

The autonomous mobile body 1 of this preferred embodiment preferably includes a hollow columnar main body 11, an electronic control device 20 is installed in the main body 11, and obstacle sensors arranged to detect peripheral obstacles are disposed on the lateral surface of the main body 11. In this preferred embodiment, the autonomous mobile body 1 preferably includes, as the obstacle sensors, a laser range finder 12, an ultrasonic sensor 13, and a stereo camera 14, for example. The laser range finder 12, the ultrasonic sensor 13, and the stereo camera 14 define and function as the obstacle information acquisition unit.

The laser range finder 12 preferably is mounted on the front surface, and scans the periphery of the autonomous mobile body in a fan-like fashion with a central angle of roughly 240° in the horizontal direction, for example. In other words, the laser range finder 12 emits a laser and measures the detection angle of the laser that returned after reflecting off the obstacle around the autonomous mobile body, and the propagation time of the laser. In addition, the laser range finder 12 calculates the distance between the autonomous mobile body and the obstacle by using the measured propagation time, and outputs, to the electronic control device 20, the calculated distance and its angle as obstacle information.

The ultrasonic sensor 13 preferably includes a pair of a transmitter and a receiver, and for example, sixteen ultrasonic sensors 13 are preferably mounted in this preferred embodiment. The sixteen ultrasonic sensor 13 are preferably mounted on the main body 11 in even intervals along the peripheral direction of the main body 11. Note that, in FIG. 1, two ultrasonic sensors 13 mounted to the front surface and the rear surface are shown, and the other ultrasonic sensors 13 are not shown. The sixteen ultrasonic sensors 13 emit ultrasonic waves to cover the entire periphery of the autonomous mobile body in a range spanning 360° around the autonomous mobile body.

Each ultrasonic sensor 13, after emitting ultrasonic waves, detects the ultrasonic waves that returned upon reflecting off the obstacle around the autonomous mobile body, and then measures the propagation time of the ultrasonic waves. It is thereby possible to detect obstacles located 360° around the autonomous mobile body. Each ultrasonic sensor 13 calculates the distance between the autonomous mobile body and the obstacle by using the measured propagation time, and outputs, to the electronic control device 20, the measured distance as obstacle information.

The stereo camera 14 is disposed at the upper front face of the main body 11, and calculates the distance and angle from the autonomous mobile body to the obstacle based on the principle of triangulation using the stereo image. The stereo camera 14 outputs, to the electronic control device 20, the calculated distance and its angle as obstacle information.

The autonomous mobile body 1 preferably includes, as a mobile unit, four electric motors 15 provided at the bottom region of the main body 11, and omni wheels 16 mounted respectively on the drive shaft of the four electric motors 15, for example. The four omni wheels 16 are disposed concyclically at even intervals by being displaced at an angle of 90° or about 90° each. The autonomous mobile body 1 individually adjusts the rotating direction and rotating speed of each of the four omni wheels 16 by independently controlling the four electric motors 15, and as a result, moves in an arbitrary direction of a 360° range. In other words, the autonomous mobile body 1 can move in an arbitrary direction such as leftward, rightward, backward, and diagonally, without changing the facing direction of the main body 11, in order to avoid obstacles.

The electronic control device 20 of the autonomous mobile body 1 comprehensively governs the control of the autonomous mobile body 1. The electronic control device 20 preferably includes a microprocessor which performs calculations, a ROM storing programs and the like to cause the microprocessor to perform the various types of processing described later, a RAM temporarily storing various types of data such as calculation results, a backup RAM, and the like, for example. Moreover, the electronic control device 20 additionally includes an interface circuit that electrically connects the laser range finder 12, the ultrasonic sensor 13 and the stereo camera 14 to the microprocessor, and a driver circuit to drive the electric motor 15.

The electronic control device 20 preferably includes, as its main constituent element to control movement, an obstacle information integration unit 21, a storage unit 22, a calculation unit 23, an action selection unit 24, and a mobile control unit 25. The obstacle information integration unit 21 is inputted the obstacle information that was output from the laser range finder 12, the ultrasonic sensor 13, and the stereo camera 14, and integrates the input obstacle information. The calculation unit 23 analyzes the situation by using the obstacle information and the various types of information stored in the storage unit 22.

The action selection unit 24 selects one action among a normal action, an avoidance action, a stopping action, and a retreat action based on the analyzed situation. In addition, the autonomous mobile body 1 moves according to the situation by the mobile control unit 25 controlling the electric motor 15 based on the selected action. Note that the action selection unit 24 corresponds to the selection unit, and the mobile control unit 25 corresponds to the mobile controller.

Figure 2:
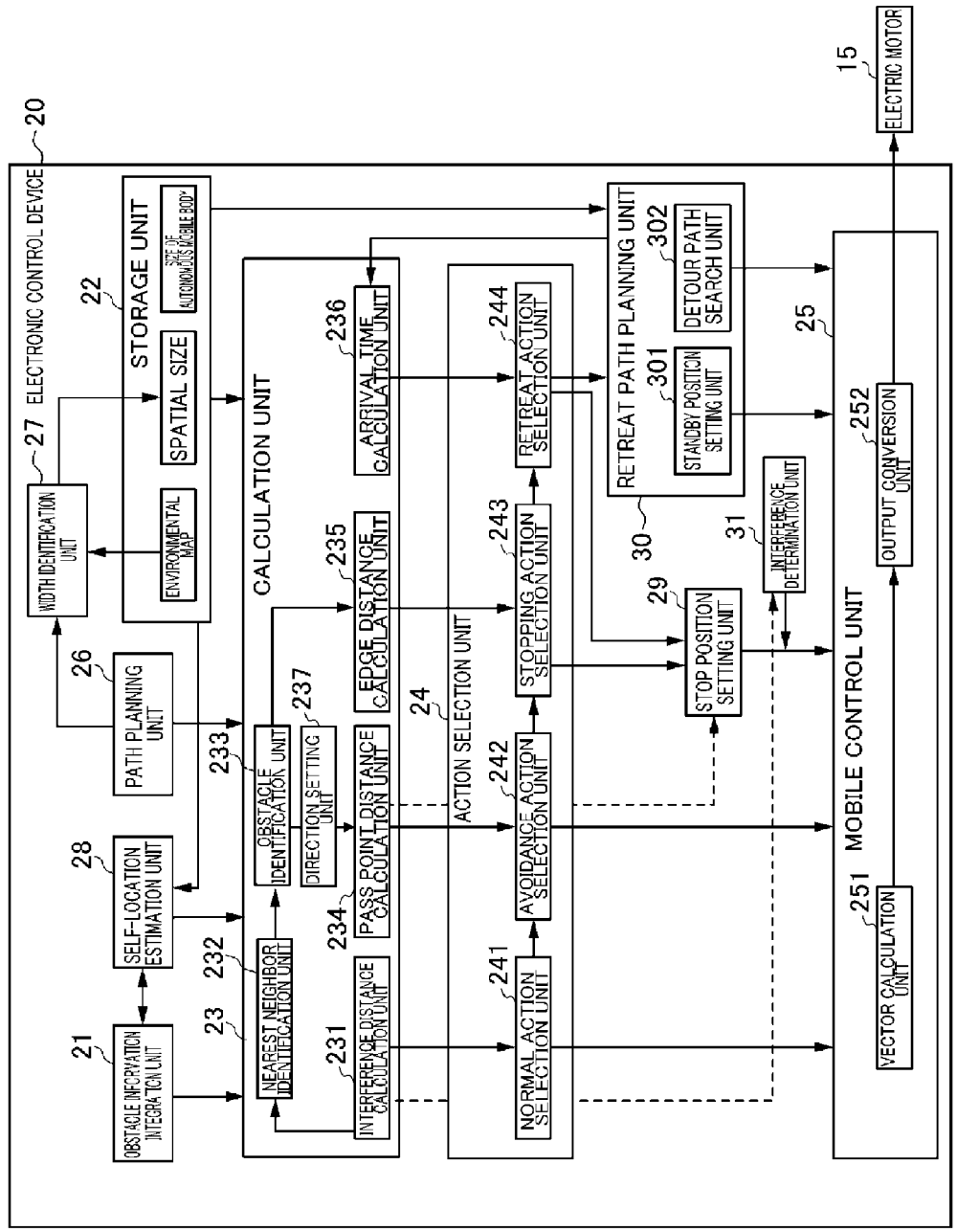
FIG. 2 is a block diagram showing the configuration of the electronic control device of the autonomous mobile body.

The constituent elements of the electronic control device 20 are now explained in detail with reference to FIG. 2. FIG. 2 is a block diagram showing the configuration of the electronic control device 20. The electronic control device 20 preferably includes, as the constituent elements that provide various types of information to the calculation unit 23, in addition to the obstacle information integration unit 21 and the storage unit 22 described above, a path planning unit 26, a width identification unit 27, and a self-location estimation unit 28.

The storage unit 22 stores in advance the size of the autonomous mobile body in the horizontal direction. This size of the autonomous mobile body is represented by using the diameter of a circle which encompasses the autonomous mobile body on a horizontal plane. In this preferred embodiment, the size of the autonomous mobile body is represented by using the diameter of a circle in which the autonomous mobile body is inscribed on a horizontal plane, and, in the foregoing case, the plane in which the diameter of the circle becomes greatest is selected as the horizontal plane. In other words, in this preferred embodiment, the size of the autonomous mobile body shows the maximum dimension of the autonomous mobile body 1 in the horizontal direction.

Moreover, the storage unit 22 stores an environmental map in advance. The environmental map includes map information of the environment where the autonomous mobile body 1 will move, and includes information regarding the region where the known obstacles exist. Known obstacles are motionless obstacles such as walls, furniture, mounted fixtures, and so on. The region where these known obstacles existing is registered in advance on the environmental map as the known obstacle region. Note that the known obstacle region may include a region in which obstacles are projected on the road surface, in addition to the obstacles placed within the passage plane, which are positioned at a height that may interfere with the autonomous mobile body 1 among the obstacles mounted on the wall surface or the obstacles that are hung from the ceiling.

The path planning unit 26 plans the path to the destination with the current location of the autonomous mobile body 1 as the point of departure. The point of departure may be estimated based on the self-location estimation processing described later, or input by the user. The destination may be set by the user, or set independently by the autonomous mobile body 1. For example, when the autonomous mobile body 1 independently detects that the autonomous mobile body 1 needs to be charged and moves to a charging station equipped with a charger, the autonomous mobile body 1 independently sets, as the destination, the location of the charger which is pre-stored on the environmental map.

The path planning unit 26 uses the size of the autonomous mobile body and the environmental map to extract a path that the autonomous mobile body can move without interfering with the known obstacles on the environmental map. In addition, the path planning unit 26 plans the path by searching the shortest path, among the plurality of extracted paths, which connects the point of departure and the destination. The path is also set in the region whether people and other autonomous mobile bodies move. For example, when the autonomous mobile body 1 is to move within a hospital, the path is set in the hall or the like of the hospital.

Figure 3A:
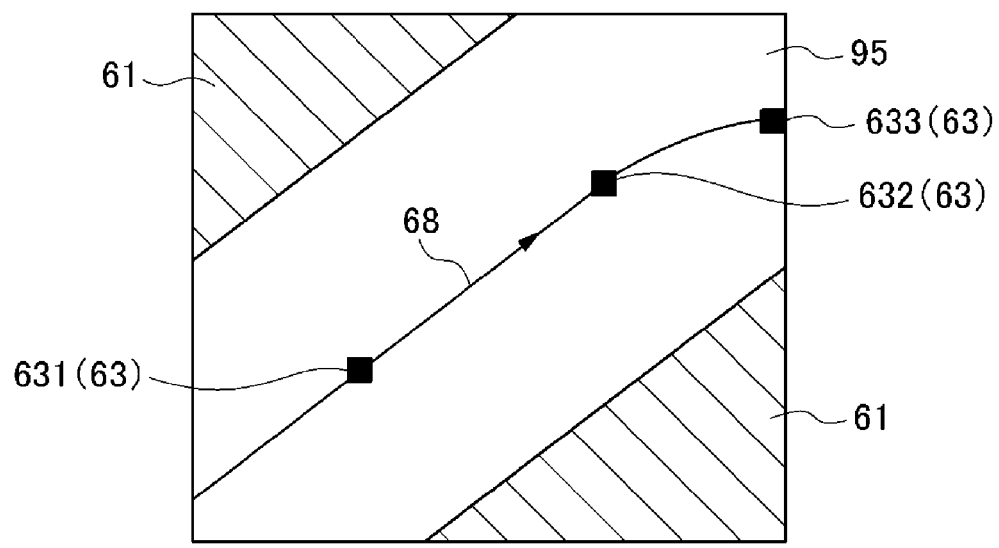
FIG. 3A is a diagram explaining the various types of information used in the mobile control.
Figure 3B:
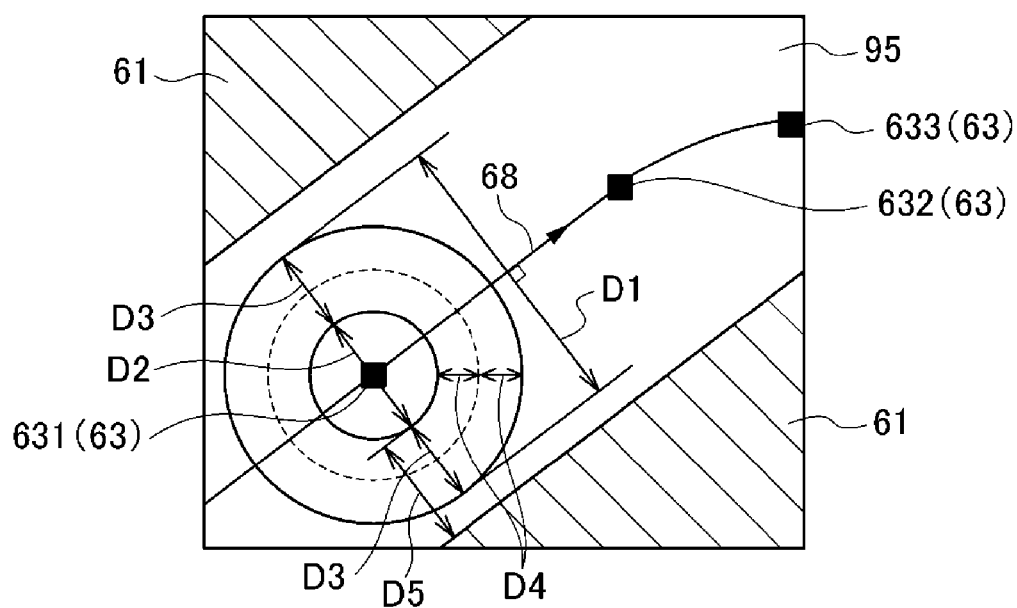
FIG. 3B is a diagram explaining the various types of information used in the mobile control.
Figure 3C:
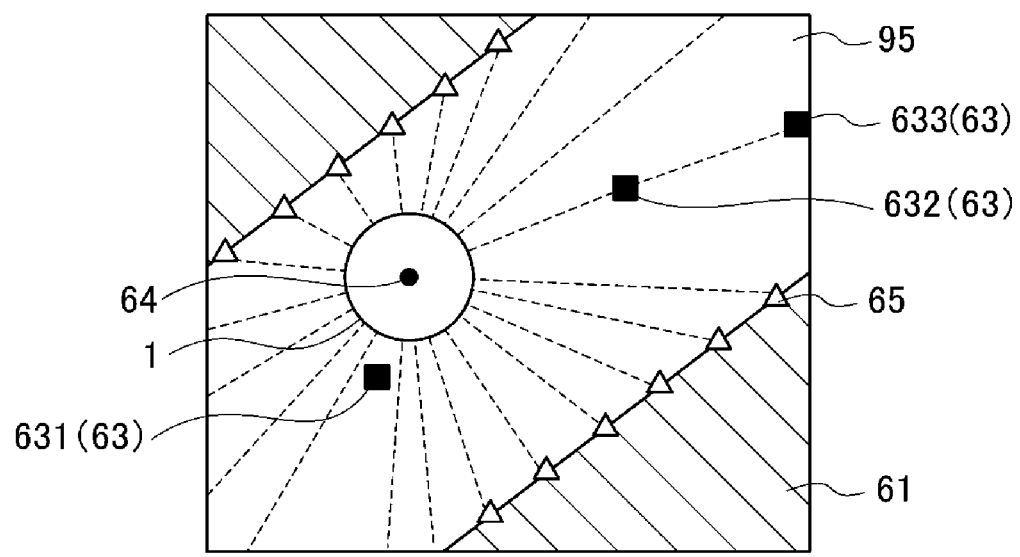
FIG. 3C is a diagram explaining the various types of information used in the mobile control.

The path planning unit 26 sets a plurality of sub goals on the planned path. Sub goals are points that are used to set the attractive force in the moving target direction upon performing mobile control using a virtual potential method. The sub goals 63 are now explained with reference to FIG. 3A. FIG. 3A to FIG. 3C are diagrams explaining the various types of information used for the mobile control, and FIG. 3A is a diagram explaining the sub goals 63.

In FIG. 3A to FIG. 3C, the hatched region shows the known obstacle region 61. The region sandwiched between the known obstacle regions 61 is the passage 95 of the autonomous mobile body 1. In other words, the passage 95 is the region where the autonomous mobile body 1 can move. A linear path 68 is planned within the passage 95. In FIG. 3A to FIG. 3C, the three sub goals 63 are shown using black squares. Note that, when differentiating the sub goals 63 as individual sub goals, they will be indicated as a sub goal 631, a sub goal 632, and a sub goal 633.

FIG. 3A shows a case where the path direction headed toward the destination is a direction from the lower left toward the upper right when facing the plane of paper. The path 68 is mainly set along the center of the passage 95 in the width direction based on an arbitrary path planning method. Accordingly, the sub goals 63, mainly as shown with the sub goal 631 and the sub goal 632, are set in the center of the passage 95 in the width direction. However, when a known obstacle exists ahead of the passage 95, or when turning right or turning left, the path 68 is planned at a position that is displaced from the center of the passage 95. In the foregoing case, as shown with the sub goal 633, the sub goal 63 is set at a position that is displaced from the center of the passage 95.

The path planning unit 26 identifies the respective positions of the sub goals 631 to 633 environmental map, and the order of the respective sub goals 631 to 633. The order of the respective sub goals 631 to 633 is set in the order of heading toward the destination. The respective positions and order of the sub goals 631 to 633 that have been identified are output by the path planning unit 26 to the storage unit 22, and stored in the storage unit 22.

The width identification unit 27 identifies the spatial size D1 regarding the respective sub goals 63. The spatial size D1 shows the size of the passage 95 in the width direction. The width direction is a direction that is perpendicular or substantially perpendicular to the path direction on a plane that is parallel or substantially parallel to the passage plane within the passage 95. As shown in FIG. 3B, in this preferred embodiment, the spatial size D1 is represented by the size D2 of the autonomous mobile body and the path clearance D3. The size D2 of the autonomous mobile body is, as described above, the diameter of the circle in which the autonomous mobile body is inscribed on the horizontal plane.

The path clearance D3 shows the clearance between the autonomous mobile body and the known obstacle region 61 such as a wall when the autonomous mobile body, which is approximated by the circle of the size D2 of the autonomous mobile body, is positioned at the sub goal 63. In other words, the path clearance D3 shows the distance that the autonomous mobile body, which is approximated by the circle of the size D2 of the autonomous mobile body, can move toward one width direction when it is positioned at the sub goal 63. Accordingly, the spatial size D1 is shown as D2+(D3×2).

The path clearance D3 is shown using a step size D4. When the distance D5 between the circle of the size D2 of the autonomous mobile body centered around the sub goal 63 and the known obstacle region 61 such as a wall positioned on one side in the width direction is larger than X times the step size D4 and small than (X+1) times the step size D4, the path clearance D3 is shown as the step size D4×X. In the example shown in FIG. 3B, since the distance D5 between the circle of the size D2 of the autonomous mobile body centered around the sub goal 63 and the known obstacle region 61 is larger than twice the step size D4 and smaller than three times the step size D4, the path clearance D3 is shown as the step size D4×2. As a result of representing the spatial size D1 by using this kind of path clearance D3, upon performing mobile control, the size of the space that the autonomous mobile body 1 can move in the width direction can be defined by the spatial size D1.

The step size D4 is preferably set, for example, to roughly 10 cm. The step size D4 is a parameter in which the value can be changed according to the environment. For example, in an environment such as in a hospital where it is relatively crowded with an unspecified number of people, the step size D4 may be set to a relatively large value in order to give preference to the safety of people. Meanwhile, in an environment such as in a warehouse where it is relatively not crowded other than certain authorized people, the step size D4 can be set to a relatively small value in order to give preference to the running efficiency of the autonomous mobile body 1.

The width identification unit 27 identifies the path clearance D3 of the respective sub goals 63 based on the environmental map, and acquires the spatial size D1 which is represented by the path clearance D3 and the size D2 of the autonomous mobile body. In addition, the spatial size D1 of each of the generated sub goals 63 is stored in the storage unit 22.

The self-location estimation unit 28 estimates the location of the autonomous mobile body 1 on the environmental map by using the Dead-reckoning technology and the SLAM (Simultaneous Localization And Mapping) technology.

Dead-reckoning is the technology of calculating the travel distance of a moving robot from the rotation of the electric motor 15. In this preferred embodiment, each drive shaft of the four electric motors 15 is mounted with an encoder arranged to detect the rotating angle of the drive shaft. The self-location estimation unit 25 computes the travel distance of the autonomous mobile body 1 from the initial location or the self-location that was estimated previously based on the rotating angle of the respective electric motors 15 output from the encoder.

SLAM is the technology of comprehending the environmental shape around the mobile robot by using sensors, and, based on the obtained shape data, creating an environmental map and estimating the self-location of the robot. In this preferred embodiment, the self-location estimation unit 28 comprehends the environmental shape around the autonomous mobile body by using the obstacle information that was integrated by the obstacle information integration unit 21.

More specifically, the self-location estimation unit 28 identifies the obstacle points indicating the existence of obstacles around the autonomous mobile body on the two-dimensional polar coordinates centered around the autonomous mobile body based on the obstacle information that was input from the obstacle information integration unit 21. In addition, the self-location estimation unit 28 refers to the travel distance of the electric motor 15, compares the obstacle points on the polar coordinates and the known obstacle region 61 on the environmental map shown with the rectangular coordinates, and estimates the center of the polar coordinates on the environmental map as the self-location.

Moreover, as shown in FIG. 3C, when the self-location on the environmental map is estimated, the obstacle information integration unit 21 identifies the location of the obstacle points 65 indicating the existence of obstacles around the autonomous mobile body on the environmental map. Note that, in FIG. 3C, the obstacle points 65 are shown with white outlined triangles.

The types of actions to be performed by the autonomous mobile body 1 are now explained. There are four types of actions performed by the autonomous mobile body 1; namely, a normal action, an avoidance action, a stopping action, and a retreat action. In addition, the retreat action can be further classified into a standby action and a detour action. The normal action is the action of moving along the planned path, and is an action that is selected when no interfering obstacle is detected. The avoidance action, the stopping action, and the retreat action are now explained with reference to FIG. 4.

Figure 4:
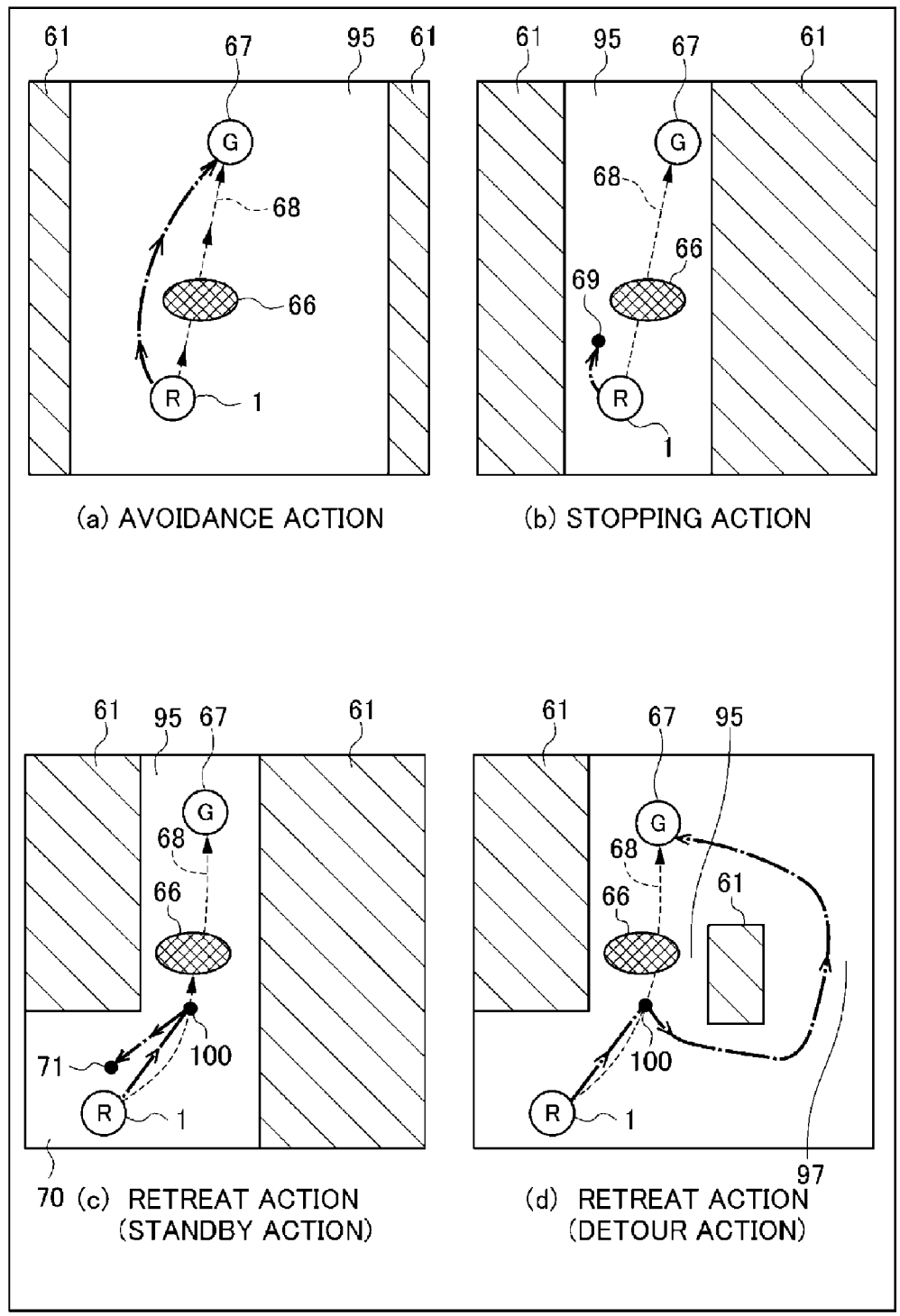
FIG. 4 is a diagram explaining the types of actions performed by the autonomous mobile body.

FIG. 4(a) is a diagram explaining the avoidance action, FIG. 4(b) is a diagram explaining the stopping action, FIG. 4(c) is a diagram explaining the standby action of the retreat action, and FIG. 4(d) is a diagram explaining the detour action of the retreat action. In FIG. 4, the hatched rectangular region shows the known obstacle region 61, and the cross-hatched oval region shows the as-yet-unknown obstacle region. The as-yet-unknown obstacle region is a region that is not registered as the known obstacle region 61 on the environmental map, and is a region where an obstacle, which is not yet known to the autonomous mobile body 1, exists. The as-yet-unknown obstacle includes moving objects such as people, and still obstacles such as baggage, and there may also be cases where a person is pushing a cart.

The broken line shown in FIG. 4 shows the planned path 68. The path 68 is planned so as to avoid known obstacles. During its movement, where are cases when an as-yet-unknown obstacle appears in the moving target direction of the autonomous mobile body 1. In the foregoing case, the autonomous mobile body 1 detects, based on obstacle information, the existence of an interfering obstacle 66 which would become an interference if the autonomous mobile body 1 continues to move forward, and selects an action among the avoidance action, the stopping action, and the retreat action.

The avoidance action is an action of the autonomous mobile body 1 heading toward the destination 67 while avoiding the interfering obstacle 66 within the passage 95 based on the obstacle information. Thus, the avoidance action is selected when there is clearance for the autonomous mobile body 1 to pass through between the interfering obstacle 66 and the known obstacle region 61. In FIG. 4(a), the dashed line shows the movement of the autonomous mobile body 1 during the avoidance action.

The stopping action is the action of pulling off to and stopping at the edge of the passage 95. Even in cases where there is no clearance for the autonomous mobile body 1 to pass through between the interfering obstacle 66 and the known obstacle region 61, when the autonomous mobile body 1 and the interfering obstacle 66 respectively move toward the edge, there are cases where the autonomous mobile body 1 and the interfering obstacle 66 may be able to pass each other passage 95. If the autonomous mobile body 1 is able to pass by the interfering obstacle 66 within the passage 95, the autonomous mobile body can reach the destination 67 efficiently by performing the retreat action. Thus, when there is enough clearance for the autonomous mobile body 1 and the interfering obstacle 66 to pass each other within the passage 95, the stopping action is selected. In the foregoing case, the autonomous mobile body 1 independently sets the stop position 69. In FIG. 4(b), the dashed line shows the movement of the autonomous mobile body 1 during the stopping action.

The retreat action is the action of the autonomous mobile body 1 retreating from the passage 95 where an interfering obstacle 66 exists. When there is not enough clearance for the autonomous mobile body 1 to pass by the interfering obstacle 66 within the passage 95, the retreat action is selected. The standby action of the retreat action is the action of retreating to the retreat path 70 which intersects with the passage 95 and standing by at the pull-off position. Consequently, when the interfering obstacle 66 is an object that can move autonomously such as a person, the interfering obstacle 66 can pass through the passage 95. When performing the standby action, the autonomous mobile body 1 independently sets the standby position 71. In FIG. 4(c), the dashed line shows the movement of the autonomous mobile body 1 during the standby action.

The detour action of the retreat action is the action of taking a detour from the passage 95 where the interfering obstacle 66 exists. In the foregoing case, the autonomous mobile body 1 passes through the detour route 97 from the passage 95 where the interfering obstacle 66 exists, and moves to the destination 67. In FIG. 4(d), the dashed line shows the movement of the autonomous mobile body 1 during the detour action. Note that, while FIGS. 4(c) and 4(d) show a case where, during the standby action and during the detour action, the autonomous mobile body 1 preferably moves from the position 100 in front of the interfering obstacle 66 to the rearward passage, if there is a passage on the left or right of the position 100, the autonomous mobile body 1 may also move from the position 100 to the left or right. Moreover, if there is a left or right passage between the position 100 and the interfering obstacle 66, the autonomous mobile body 1 may move left or right after moving forward.

In order for the autonomous mobile body 1 to select the action according to the situation, the calculation unit 23 preferably includes an interference distance calculation unit 231, a nearest neighbor identification unit 232, an obstacle identification unit 233, a pass point distance calculation unit 234, an edge distance calculation unit 235, an arrival time calculation unit 236, and a direction setting unit 237. In addition, the action selection unit 24 preferably includes a normal action selection unit 241, an avoidance action selection unit 242, a stopping action selection 243, and a retreat action selection 244.

Figure 5A:
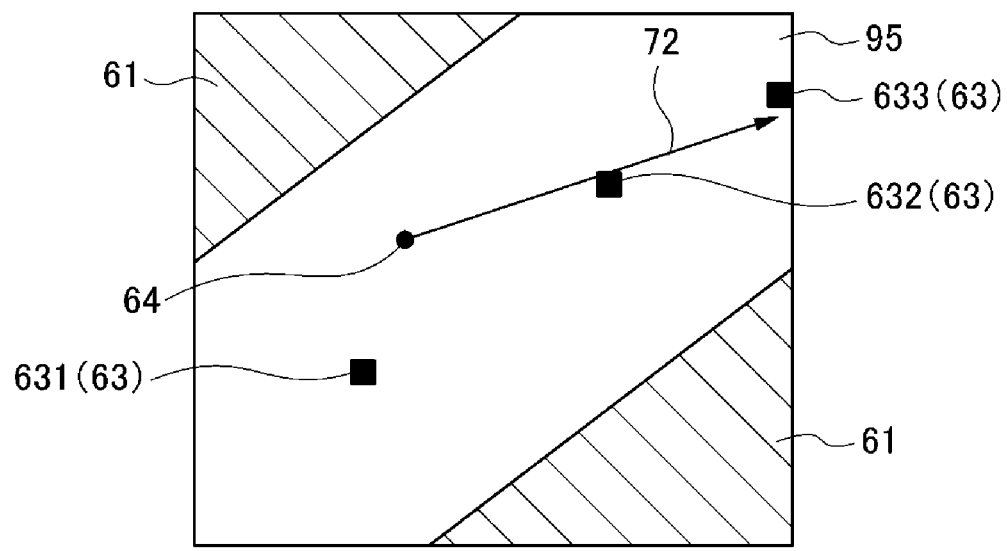
FIG. 5A is a diagram explaining the calculation method of the interference distance.
Figure 5B:
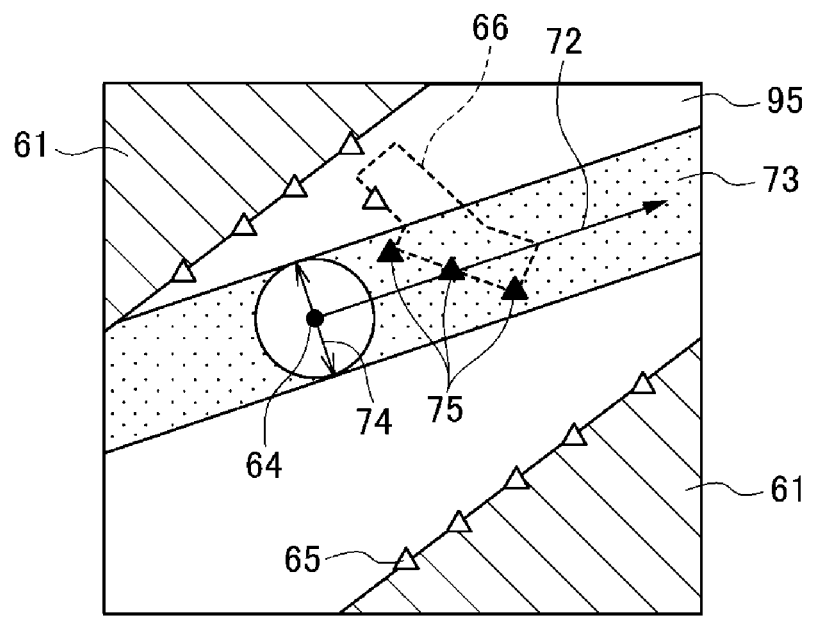
FIG. 5B is a diagram explaining the calculation method of the interference distance.
Figure 5C:
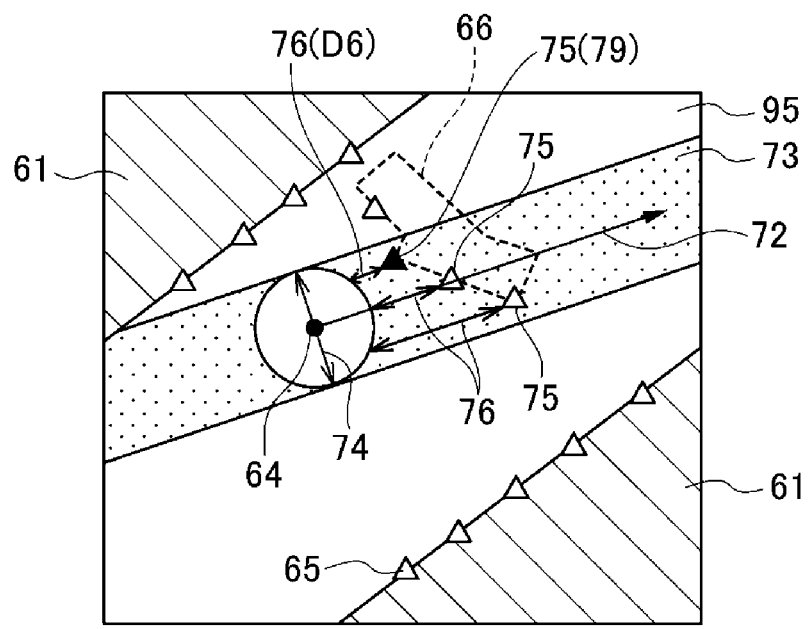
FIG. 5C is a diagram explaining the calculation method of the interference distance.

The interference distance calculation unit 231 calculates the interference distance for the normal action selection unit 241 to determine whether to select the normal action. The interference distance is the distance between the autonomous mobile body 1 and the interfering obstacle 66. The calculation method of the interference distance performed by the interference distance calculation unit 231 is now explained with reference to FIG. 5A to FIG. 5C. FIG. 5A to FIG. 5C are diagrams explaining the calculation method of the interference distance.

Foremost, as shown in FIG. 5A, the interference distance calculation unit 231 determines the moving target direction 72. The interference distance calculation unit 231 identifies the sub goals 63 within a given range from the self-location 64 that was estimated by the self-location estimation unit 28, and sets the vector heading from the self-location 64 to the respective sub goals 63 within a given range. In the example shown in FIG. 5A, a vector heading from the self-location 64 to the forward sub goals 632, 633 is set. Subsequently, the interference distance calculation unit 231 calculates the resultant vector of the plurality of vectors that were set, and sets the direction of the calculated resultant vector as the moving target direction 72. This moving target direction 72 is the moving target direction of the autonomous mobile body 1, and becomes the attractive force direction upon controlling the movement of the autonomous mobile body 1 by using the virtual potential method.

Subsequently, as shown in FIG. 5B, the interference distance calculation unit 231 sets the interference zone 73. The interference zone 73 is a strip-shaped region extending parallel to the moving target direction 72, and the size 74 in the width direction that is perpendicular or substantially perpendicular to the moving target direction 72 is set as the size D2 of the autonomous mobile body or the size obtained by adding the clearance to the size D2 of the autonomous mobile body. Moreover, the interference zone 73 is set so that the self-location 64 is positioned at the center in the width direction. In addition, the interference distance calculation unit 231 identifies, as the interfering points 75, the obstacle points 65 positioned in the interference zone 73 that is forward of the self-location 64 among the obstacle points 65 that are identified by the obstacle information. In FIG. 5B, the identified interfering points 75 are shown as black triangles, and the other obstacle point 65 are shown as white triangles. Note that, in FIG. 5A to FIG. 5C, the interfering obstacle 66 is shown with a broken line.

Finally, as shown in FIG. 5C, the interference distance calculation unit 231 calculates the distance 76 from the autonomous mobile body 1 to the respective interfering points 75. The distance 76 is a distance of a direction that is parallel or substantially parallel to the moving target direction 72. The interference distance calculation unit 231 sets, as the interference distance D6, the shortest distance among the calculated distances 76.

When the interference distance D6 calculated by the interference distance calculation unit 231 is larger than a predetermined threshold, and when the interfering point 75 was not identified by the interference distance calculation unit 231, the normal action selection unit 241 determines that an interfering obstacle 66 was not detected. When it is determined that an interfering obstacle 66 was not detected, the normal action selection unit 241 selects the normal action. Meanwhile, the normal action selection unit 241 determines that an interfering obstacle 66 was detected when the interference distance D6 is equal to or less than the threshold, and does not select the normal action. In the foregoing case, an action other than the normal action is selected by the avoidance action selection unit 242, the stopping action selection 243, or the retreat action selection 244.

When the interference distance D6 is equal to or less than the threshold, the nearest neighbor identification unit 232 identifies the nearest neighbor interfering point 79, which is the closest point that will interfere with the autonomous mobile body 1 among the interfering points 75.

Specifically, the nearest neighbor identification unit 232 identifies the interfering point 75 of the interference distance D6 calculated by the interference distance calculation unit 231 as the nearest neighbor interfering point 79. In FIG. 5C, the nearest neighbor interfering point 79 identified by the nearest neighbor identification unit 232 is shown as a black triangle, and the other interfering points 75 are shown as white triangles.

Figure 6A:
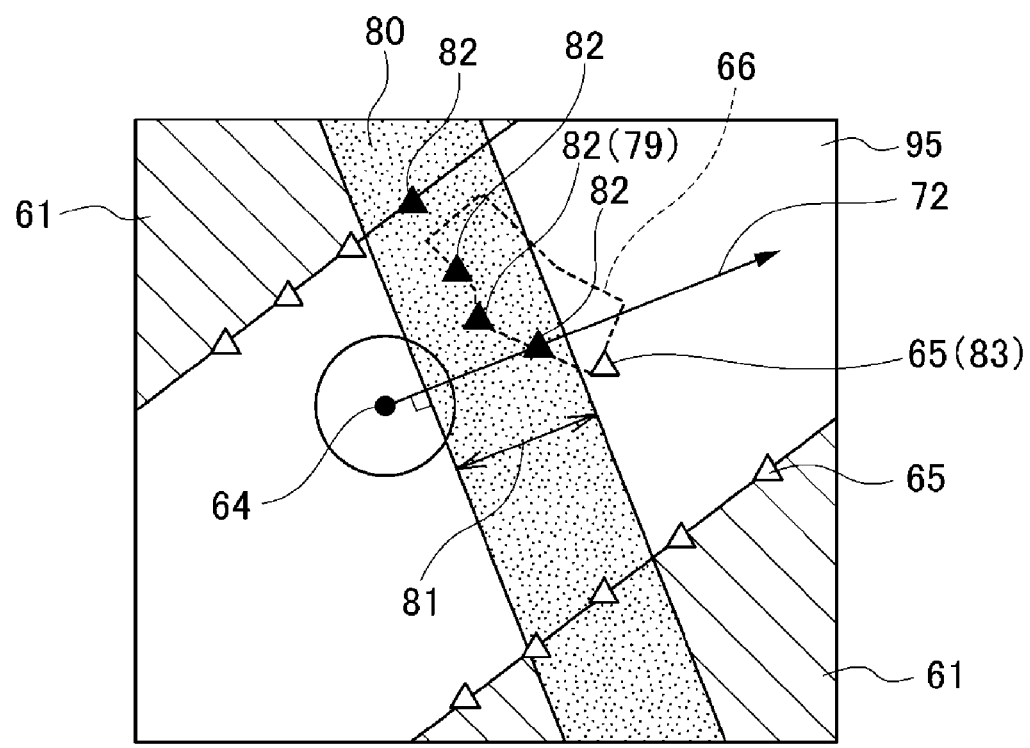
FIG. 6A is a diagram explaining the identification method of edge positions.
Figure 6B:
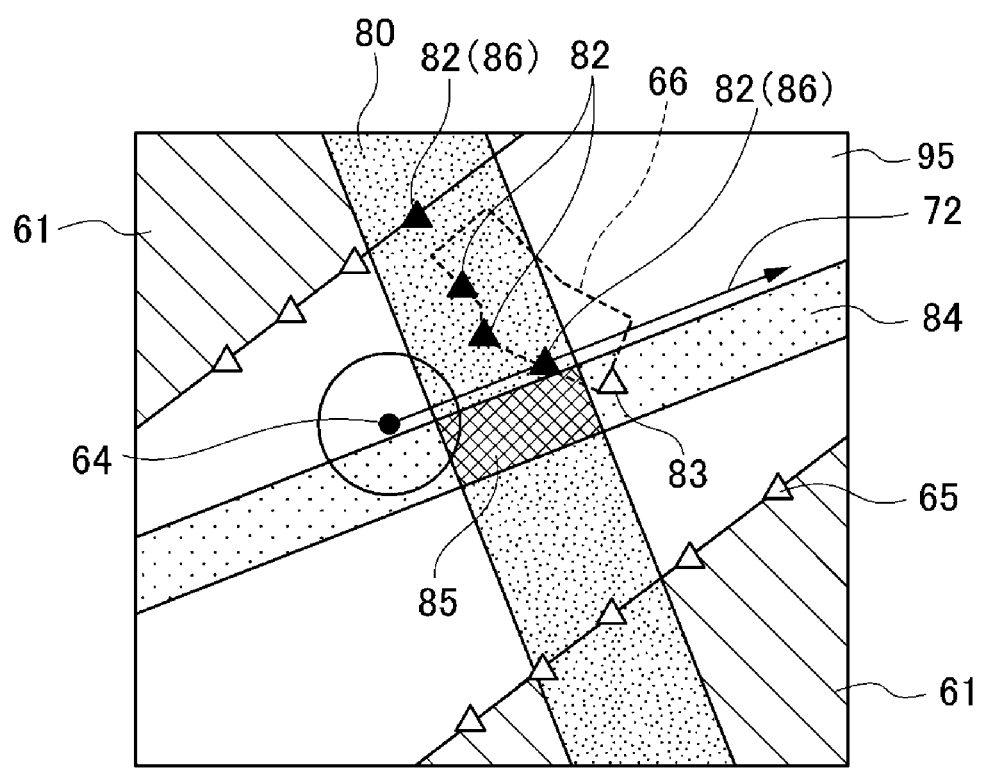
FIG. 6B is a diagram explaining the identification method of edge positions.

The obstacle identification unit 233 clusters the obstacle points 65, which can be deemed a cluster, in order to identify edge positions of the interfering obstacle 66. The identification method of edge positions performed by the obstacle identification unit 233 is now explained with reference to FIG. 6A and FIG. 6B. FIG. 6A and FIG. 6B are diagrams explaining the identification method of edge positions.

Foremost, as shown in FIG. 6A, the obstacle identification unit 233 sets the edge detection zone 80. The edge detection zone 80 is a strip-shaped region extending perpendicular or substantially perpendicular to the moving target direction 72, and is set so that the nearest neighbor interfering point 79 is positioned in the center of the width direction that is parallel or substantially parallel to the moving target direction 72. The size 81 of the edge detection zone 80 in the width direction can be set arbitrarily, but is preferably set, for example, to about 10 cm to about 20 cm. In addition, the obstacle identification unit 233 identifies the obstacle points contained in the edge detection zone 80 among the obstacle points 65, and clusters the identified obstacle points 82. In FIG. 6A, the clustered obstacle points 82 are shown as black triangles, and the other obstacle points 65 are shown as white triangles.

The obstacle identification unit 233 identifies whether an obstacle point is the obstacle point 82 in the edge detection zone 80 in order from those closest to the nearest neighbor interfering point 79. When the obstacle point 83 positioned next to the identified obstacle point 82 is outside the edge detection zone 80, the obstacle identification unit 233 determines whether that obstacle point 83 is a singular point. In order to determine whether the obstacle point 83 is a singular point, as shown in FIG. 6B, the obstacle identification unit 233 sets a singular point detection zone 84. The singular point detection zone 84 is a strip-shaped region extending parallel or substantially parallel to the moving target direction 72, and is set so that the determination-target obstacle point 83 is positioned at the center of the width direction that is perpendicular or substantially perpendicular to the moving target direction 72.

The obstacle identification unit 233 determines that the obstacle point 83 is a singular point when there is an obstacle point 65 positioned in an overlapping region 85 of the edge detection zone 80 and the singular point detection zone 84, and clustering is performed including the obstacle point 65 in the region 85. In addition, whether the obstacle point 65 in the region 85 is the obstacle point 82 in the edge detection zone 80 in order from those closest to the nearest neighbor interfering point 79. In the example shown in FIG. 6B, since no obstacle point 65 exists in the region 85, only the obstacle point 82 identified above is clustered.

Consequently, the obstacle points 65 that can be deemed a cluster with the nearest neighbor interfering point 79 in the edge detection zone 80 are clustered. In addition, the obstacle identification unit 233 identifies, as the edge points 86, the two obstacle points 82 that are farthest among the clustered obstacle points 82 and perpendicular or substantially perpendicular to the moving target direction 72. In other words, the edge points 86 are positions of both ends of a region in which the interfering obstacle 66 exists, the both ends being both ends on a plane parallel or substantially parallel to a passage plane in a direction which is substantially perpendicular to the moving target direction 72 of the autonomous mobile body. In this preferred embodiment, the edge points 86 can be deemed points where both ends of the interfering obstacle 66 are positioned in the strip-shaped edge detection zone 80 extending in the lateral direction and positioned in front of the autonomous mobile body 1. In FIG. 6A and FIG. 6B, to facilitate viewing, the width of the edge detection zone 80 is drawn largely relative to the circle indicating the size D2 of the autonomous mobile body, but in reality since the width of the edge detection zone 80 is small relative to the size D2 of the autonomous mobile body, the straight line that connects the two edge points 86 becomes perpendicular or substantially perpendicular to the moving target direction 72.

The direction setting unit 237 sets the avoidance direction and the pass point distance calculation unit 234 calculates the pass point distance so that the avoidance action selection unit 242 can determine whether it is possible to avoid, on the path, the interfering obstacle 66 having the edge points 86 identified by the obstacle identification unit 233. The pass point distance is the distance between the avoidance pass point which the autonomous mobile body 1 passes through upon avoiding the interfering obstacle 66 within the passage 95, and the planned path 68. In other words, the pass point distance calculation unit 234 calculates the distance that the autonomous mobile body 1 needs to deviate from the path 68 in order to avoid the interfering obstacle 66.

Figure 7A:
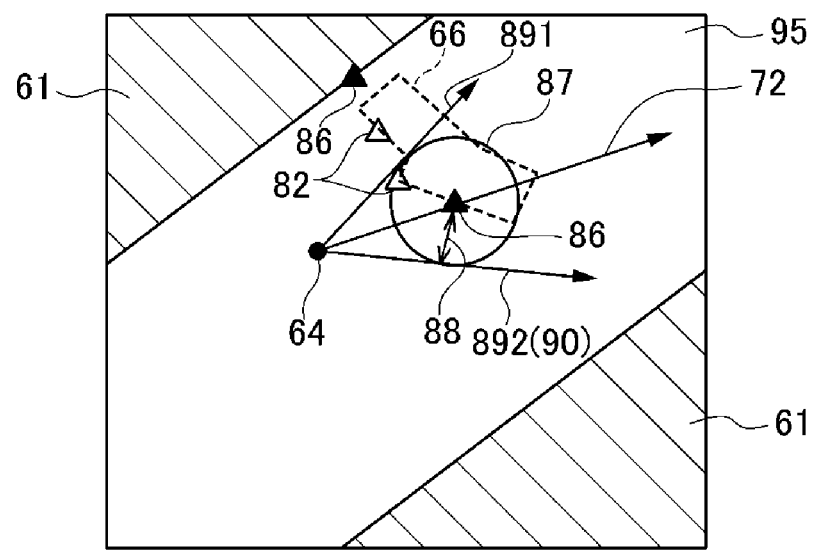
FIG. 7A is a diagram explaining the method of calculating the distance between the avoidance pass point and the path.
Figure 7B:
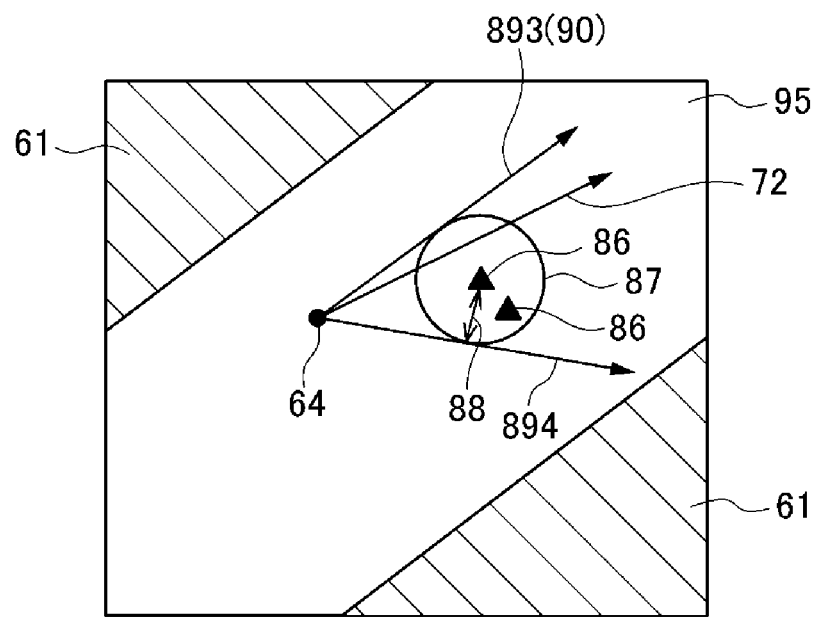
FIG. 7B is a diagram explaining the method of calculating the distance between the avoidance pass point and the path.
Figure 7C:
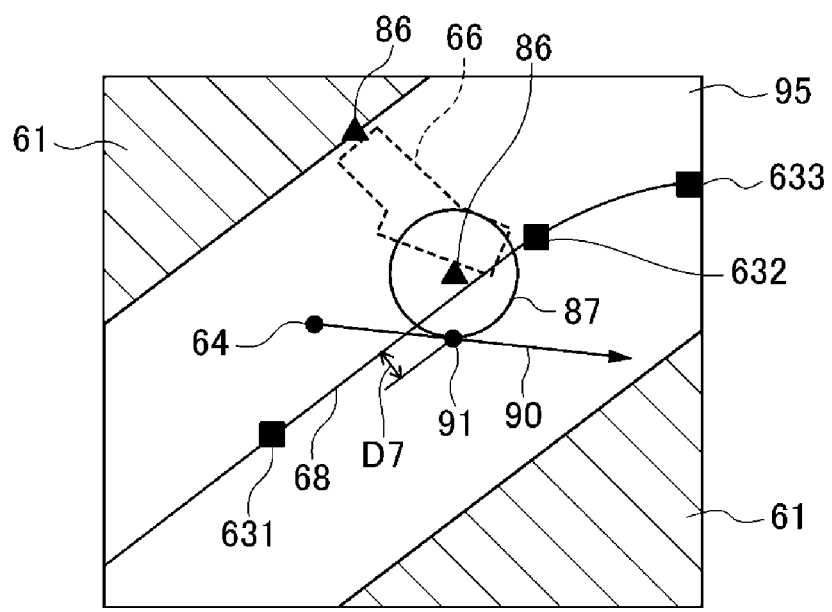
FIG. 7C is a diagram explaining the method of calculating the distance between the avoidance pass point and the path.

The method of calculating the distance between the avoidance pass point 91 and the path 68 is now explained with reference to FIG. 7A to FIG. 7C. FIG. 7A to FIG. 7C are diagrams explaining the method of calculating the distance between the avoidance pass point 91 and the path 68.

Foremost, as shown in FIG. 7A, the direction setting unit 237 sets the avoidance direction based on the size D2 of the autonomous mobile body and the edge points 86. The direction setting unit 237 sets a virtual circle 87 centered around the edge point 86 near the self-location 64 of the two edge points 86. The radius 88 of the virtual circle 87 is set to a safe distance obtained by adding the clearance to half the size D2 of the autonomous mobile body. Accordingly, by setting the edge point 86 as the virtual circle 87, the autonomous mobile body 1 can be treated as a point.

In addition, the direction setting unit 237 draws two tangent lines 891, 892 that pass through the self-location 64 and come into contact with the virtual circle 87. The direction setting unit 237 selects one tangent line of the two tangent lines 891, 892, and sets the avoidance direction 90. In the example shown in FIG. 7A, since one tangent line 891 is sandwiched by two edge points 86, if the autonomous mobile body 1 moves in the direction of this one tangent line 891, it will interfere with the interfering obstacle 66. If the autonomous mobile body 1 moves in the direction of the other tangent line 892, it is possible to avoid the interfering obstacle 66. Thus, the direction setting unit 237 sets the tangent line 892, which is not sandwiched by the edge points 86, as the avoidance direction 90.

Note that, in the example shown in FIG. 7B, two edge points 86 are positioned between two tangent lines 893, 894. In the foregoing case, the direction setting unit 237 sets the tangent line 893 on the side of the edge point 86 close to the self-location 64 is set as the avoidance direction 90.

Subsequently, as shown in FIG. 7C, the pass point distance calculation unit 234 identifies the contact point of the tangent line 89 indicating the avoidance direction 90 and the virtual circle 87 as the avoidance pass point 91 to be passed through during the avoidance. In addition, the pass point distance calculation unit 234 calculates the shortest distance between the path 68 connecting the sub goal 631 and the sub goal 632, and the avoidance pass point 91, as the pass point distance D7.

Figure 8A:
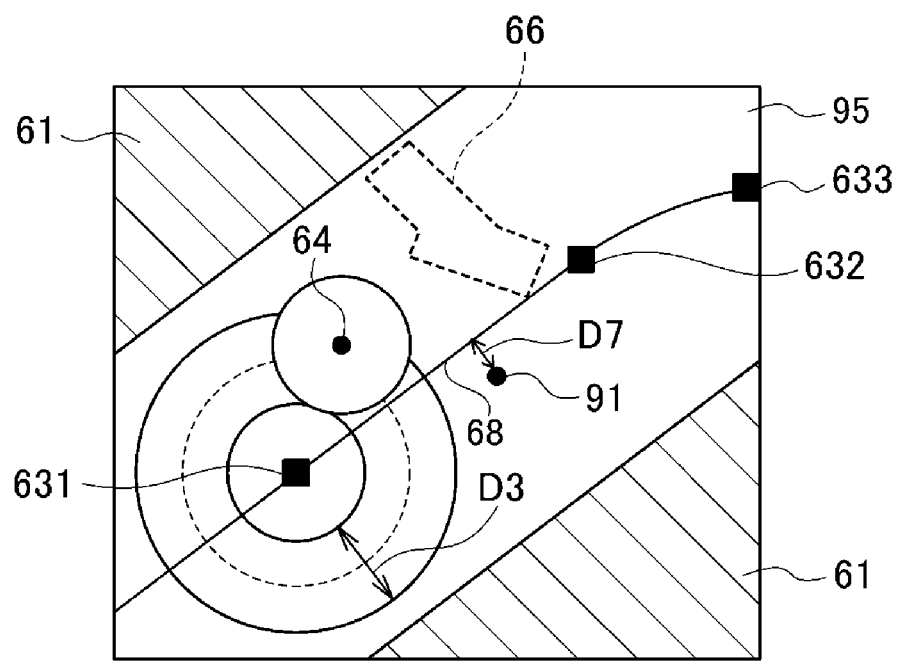
FIG. 8A is a diagram explaining the method of determining whether the avoidance action is possible.
Figure 8B:
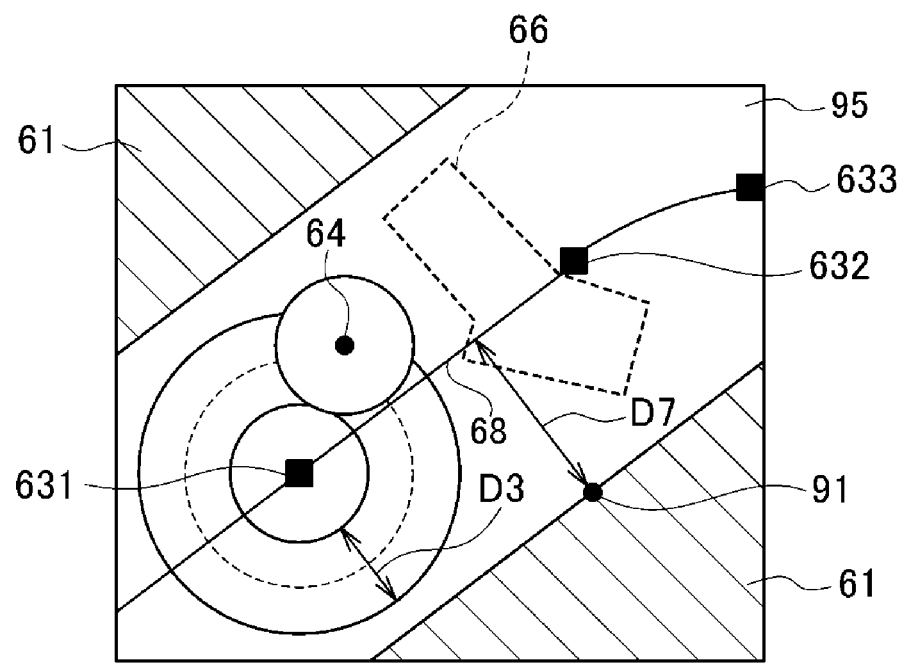
FIG. 8B is a diagram explaining the method of determining whether the avoidance action is possible.

The avoidance action selection unit 242 determines whether the avoidance action is possible based on the pass point distance D7, and the path clearance D3 of the nearest or preceding sub goal 631. The method of determining whether the avoidance action is possible is now explained with reference to FIG. 8A and FIG. 8B. FIG. 8A and FIG. 8B are diagrams explaining the method of determining whether the avoidance action is possible.

As shown in the example of FIG. 8A, if the pass point distance D7 is equal to or less than the path clearance D3, there is clearance between the known obstacle region 61 and the autonomous mobile body 1 even when the autonomous mobile body 1 deviates from the avoidance pass point 91 in order to avoid the interfering obstacle 66. Thus, when the pass point distance D7 is equal to or less than the path clearance D3, the avoidance action selection unit 242 determines that avoidance is possible. Consequently, the avoidance action selection unit 242 selects the avoidance action.

As shown in the example of FIG. 8B, if the pass point distance D7 is larger than the path clearance D3, since there is a possibility of interference with the known obstacle region 61 when the autonomous mobile body 1 deviates from the avoidance pass point 91 in order to avoid the interfering obstacle 66, the avoidance action selection unit 242 determines that avoidance is not possible. Consequently, the avoidance action selection unit 242 does not select the avoidance action. Note that, as shown in FIG. 8A and FIG. 8B, the path clearance D3 shows the distance that the autonomous mobile body can move from the path 68 to a direction which is on the avoidance pass point 91 side and which is perpendicular or substantially perpendicular to the path direction within the passage 95. The width identification unit that acquires this path clearance D3 corresponds to the clearance identification unit.

Figure 9A:
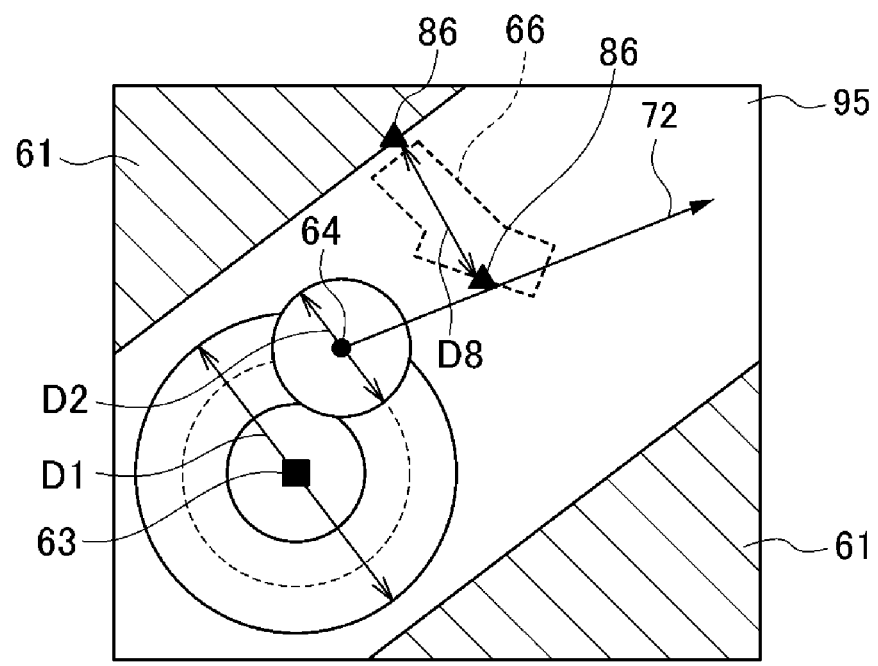
FIG. 9A is a diagram explaining the selection method of the stopping action and the retreat action.
Figure 9B:
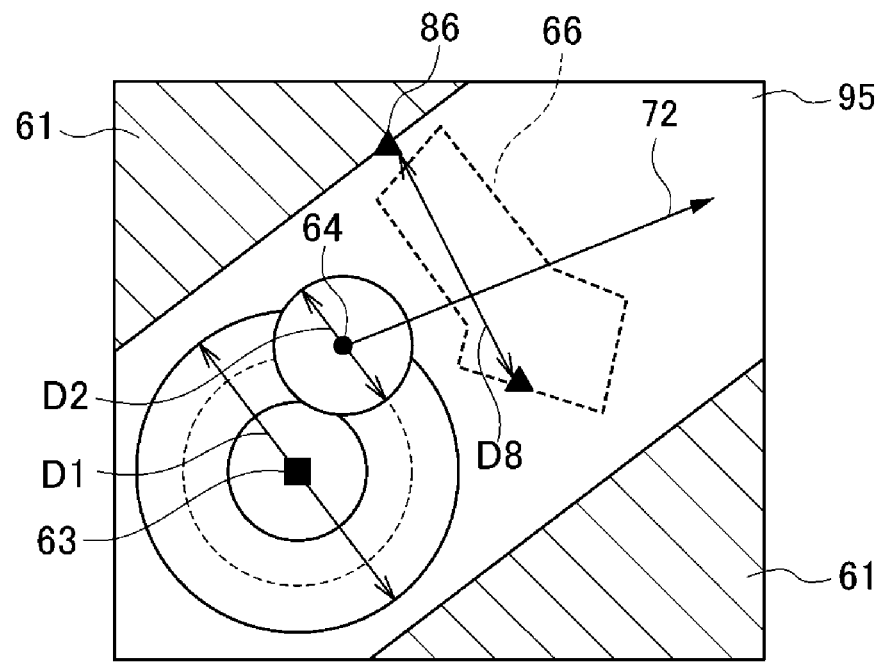
FIG. 9B is a diagram explaining the selection method of the stopping action and the retreat action.

When the avoidance action selection unit 242 did not select the avoidance action, the edge distance calculation unit 235 calculates the distance between the two edge points 86 in order for the stopping action selection 243 to select either the stopping action or the retreat action. The selection method of the stopping action and the retreat action is now explained with reference to FIG. 9A and FIG. 9B. FIG. 9A and FIG. 9B are diagrams explaining the selection method of the stopping action and the retreat action.

As shown in FIG. 9A, the edge distance calculation unit 235 calculates the two edge points 86, and sets the calculated distance as the size D8 of the interfering obstacle 66. The size D8 of the interfering obstacle 66 is the size of the direction that is perpendicular or substantially perpendicular to the moving target direction 72 on a plane that is parallel or substantially parallel to the passage plane, and is the size of the portion in the edge detection zone 80 of the interfering obstacle 66.

The stopping action selection 243 selects either the stopping action or the retreat action based on the spatial size D1, the size D2 of the autonomous mobile body, and the size D8 of the interfering obstacle 66. The stopping action is selected when the autonomous mobile body 1 cannot move in the moving target direction 72 since there is an obstacle, and, although there is no clearance in the road width to perform the avoidance action, there is enough clearance for the autonomous mobile body 1 and the interfering obstacle 66 to pass each other within the passage 95 if the autonomous mobile body 1 and the interfering obstacle 66 mutually move toward the edge of the passage 95.

The stopping action selection 243 determines that there is enough clearance for the autonomous mobile body 1 and the interfering obstacle 66 to pass each other within the passage 95 when the total value of the size D2 of the autonomous mobile body and the size D8 of the interfering obstacle 66 is smaller than the spatial size D1. Consequently, the stopping action selection 243 selects the stopping action in order to move to and stop at the edge of the passage 95. In the example shown in FIG. 9A, since the total value of the size D2 of the autonomous mobile body and the size D8 of the interfering obstacle 66 is smaller than the spatial size D1, the stopping action is selected. The stopping action selection 243 determines that there is not enough clearance for the autonomous mobile body 1 and the interfering obstacle 66 to pass each other within the passage 95 when the total value of the size D2 of the autonomous mobile body and the size D8 of the interfering obstacle 66 is equal to or larger than the spatial size D1. Consequently, the stopping action selection 243 selects the retreat action. In the example shown in FIG. 9B, since the total value of the size D2 of the autonomous mobile body and the size D8 of the interfering obstacle 66 is equal to or larger than the spatial size D1, the retreat action is selected.

Note that the stopping action selection 243 may also analyze the image captured by the stereo camera 14 and determine whether the interfering obstacle 66 is an obstacle such as a person or another autonomous mobile body capable of taking evasive action, and select the stopping action or the pull-off action by giving consideration to the determination result. In the foregoing case, the stopping action selection 243 selects the stopping action when the total value of the size D2 of the autonomous mobile body and the size D8 of the interfering obstacle 66 is smaller than the spatial size D1, and when the interfering obstacle 66 is an obstacle capable of taking evasive action. Moreover, the stopping action selection 243 selects the pull-off action if the interfering obstacle 66 is not an obstacle capable of taking evasive action even when the total value of the size D2 of the autonomous mobile body and the size D8 of the interfering obstacle 66 is smaller than the spatial size D1.

When the stopping action is selected, the electronic control device 20 includes the stop position setting unit 29 so that the autonomous mobile body 1 can independently set the stop position. The stop position setting unit 29 sets the stop position at the edge of the passage 95 where the autonomous mobile body 1 is to move to and stop at in order to pass by the interfering obstacle 66 within the passage 95.

Figure 10:
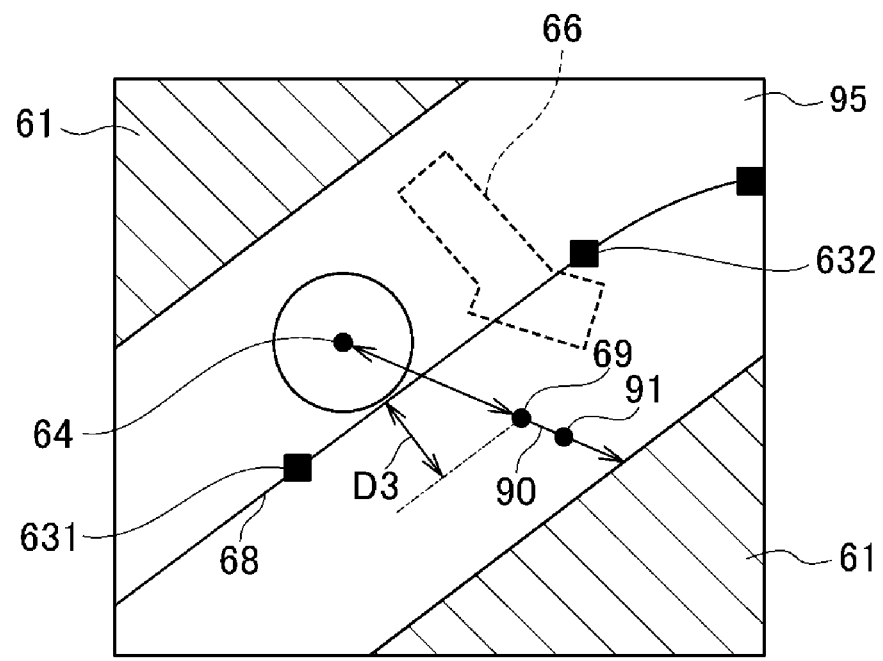
FIG. 10 is a diagram explaining the setting method of the stop position.

The setting method of the stop position is now explained with reference to FIG. 10. FIG. 10 is a diagram explaining the setting method of the stop position. The stop position setting unit 29 sets the stop position 69 by using the avoidance direction 90 set above. The stop position setting unit 29 sets the stop position 69 on the straight line indicating the avoidance direction 90. In other words, the stop position setting unit 29 sets the stop position 69 by using the avoidance direction 90 as the pull-off direction. Accordingly, the direction setting unit 237 that sets the avoidance direction 90 (pull-off direction) corresponds to the direction setting unit. Moreover, the stop position setting unit 29 sets the stop position 69 at the edge of the passage 95 with a clearance from the known obstacle region 61 shown on the environmental map. For example, the stop position 69 is set, on the straight line shown in the pull-off direction (avoidance direction 90), at a position where the distance from the path 68 is the path clearance D3. Moreover, the stop position 69 may also be a position that is closest to the edge on the avoidance direction 90 to an extent that the autonomous mobile body 1 does not come into contact with the known obstacle 61.

Meanwhile, when the retreat action is selected, the retreat action selection unit 244 selects either the standby action or the detour action. The retreat action selection unit 244 selects one action, of the standby action and the detour action, which will result in the faster arrival at the destination. Thus, the arrival time calculation unit 236 calculates the arrival time to the destination when the standby action is selected and the arrival time to the destination when the detour action is selected.

Returning to FIG. 2, the electronic control device 20 includes a retreat path planning unit 30 for the arrival time calculation unit 236 to calculate the arrival times of the standby action and the detour action. The retreat path planning unit 30 searches for the retreat path by using the environmental map stored in the storage unit 22, and the path 68 that was previously planned by the path planning unit 26. The retreat path includes the path up to the standby position to be used when the standby action is selected, and the detour route 97 to be used when the detour action is selected. The retreat path planning unit 30 includes a standby position setting unit 301 arranged to set the standby position and plan the path up to the set standby position, and a detour route search unit 302 arranged to search for the detour path 97 and plan the path up to the destination 67 by passing through the detour route 97. The detour route search unit 302 corresponds to the search unit.

Figure 11:
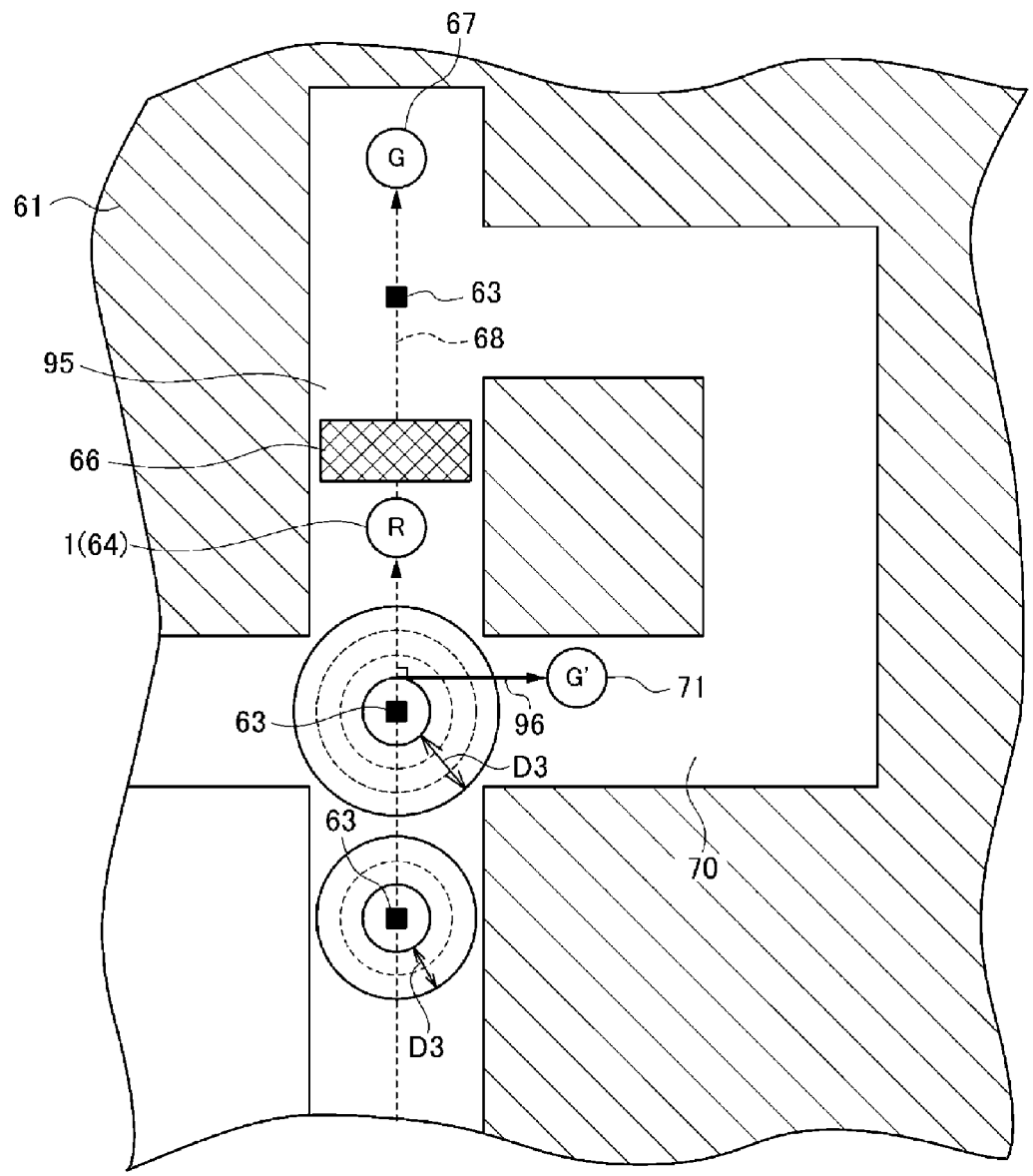
FIG. 11 is a diagram explaining the setting method of the standby position.

The setting method of the standby position performed by the standby position setting unit 301 is now explained with reference to FIG. 11. FIG. 11 is a diagram explaining the setting method of the standby position. Foremost, the standby position setting unit 301 identifies the retreat path 70 containing the path clearance D3 where the standby position 71 can be set. As the retreat path 70 where the standby position 71 can be set, there is a passage which intersects with the passage 95 where the interfering obstacle 66 exists.

On the passage 95, at the sub goal 63 on the intersection which intersects with another passage, the path clearance D3 is larger than the sub goals 63 within the passage other than at the intersection. Accordingly, the standby position setting unit 301 identifies, for example, the sub goal 63 behind the self-location 64, preferably on the intersection closest from the self-location 64, based on the path clearance D3 of the respective sub goals 63 stored in the storage unit 22. Note that if the self-location 64 is on the sub goal 63 of the intersection, that sub goal 63 may also be identified. Moreover, when there is a sub goal 63 on the intersection of the self-location 64 and the interfering obstacle 66, and there is clearance between the self-location 64 and the interfering obstacle 66, that sub goal 63 may also be identified.

In addition, the standby position setting unit 301 identifies the passage that intersects with the passage 95 at a position of the identified sub goal 63 on the intersection as the retreat path 70 where the standby position 71 is to be set. Subsequently, the standby position setting unit 301 sets the standby position 71 on a straight line 96 that is perpendicular or substantially perpendicular to the path 72 of the passage 95 on the identified retreat path 70. In addition, the standby position setting unit 301 sets the standby position 71 as a temporary destination, and performs the path plan from the self-location 64 to the standby position 71. Note that the standby position setting unit 301 may identify, without limitation to the sub goal 63 on the intersection, a sub goal 63 in which the spatial size D1 is equal to or larger than the total value of the size D2 of the autonomous mobile body and the size D8 of the interfering obstacle 66, and set the position most closest to the edge near the identified sub goal 63 as the standby position.

The detour route search unit 302 searches for the detour route 97 (FIG. 4(d)) to take a detour from the passage 95 where the interfering obstacle 66 exists, and plans the path from the self-location 64 to the destination 67. Note that the path planning by the standby position setting unit 301 and the path planning of the detour route 97 by the detour route search unit 302 are performed using the same algorithm as the path planning performed by the foregoing path planning unit 26 based on the environmental map, the spatial size D1, the size D2 of the autonomous mobile body and other information.

The arrival time calculation unit 236 calculates the arrival time to the destination 67 when the standby action is selected, and the arrival time to the destination 67 when the detour action is selected. The arrival time calculation unit 236 calculates the arrival time during the standby action based on the path planned by the standby position setting unit 301 and the original path 68 planned by the path planning unit 26. As the arrival time of the standby action, the total value of the time required to move from the self-location 64 to the standby position 71, the standby time, and the time required to once again move from the standby position 71 to the destination 67 along the original planned path 68 is calculated.

Moreover, the arrival time calculation unit 236 calculates the arrival time during the detour action based on the path planned by the detour route search unit 302. Specifically, the arrival time calculation unit 236 calculates, as the arrival time of the detour action, the time required to move from the self-location 64 to the destination 67 upon passing through the detour route 97.

The retreat action selection unit 244 selects one action with a shorter arrival time of the calculated arrival times of the standby action and the detour action. The method of the action selection unit 24 selecting the action based on the calculation results of the calculation unit 23 was explained above. The method of the mobile control unit 25 controlling the movement of the autonomous mobile body 1 based on the selected action will now be explained.

In this preferred embodiment, the mobile control unit 25 uses the virtual potential method to control the movement to the destination 67 while avoiding obstacles. The virtual potential method is a method of generating a virtual potential field obtained by superimposing a virtual attractive force potential field relative to the sub goal 63 and a virtual repulsive force potential field relative to the obstacle, and using the force generated by this virtual potential field in the mobile control. The mobile control unit 25 includes a vector calculation unit 251 and an output conversion unit 252 to perform mobile control based on the virtual potential method.

The vector calculation unit 251 calculates the attractive vector based on the action selected by the action selection unit 24. Moreover, the vector calculation unit 251 calculates the repulsive force vector based on the self-location 64, the mobile speed of the autonomous mobile body, the path clearance D3, and the obstacle position and mobile speed which are identified based on the obstacle information. In addition, the vector calculation unit 251 calculates the resultant vector of the attractive vector and the repulsive force vector.

The output conversion unit 252 converts the resultant vector calculated by the vector calculation unit 251 into an output of the electric motor 15. The output conversion unit 252 adjusts the output of the four electric motors 15 so that the autonomous mobile body 1 will move in the direction of the resultant vector at the speed shown with the norm of the resultant vector.

When the normal action is selected, the attractive vector is calculated based on the position and distance of the sub goals 63 near the self-location 64. For example, the direction of the attractive vector is set in the moving target direction 72 described above. The norm is set, for example, to a predetermined input speed that is assigned to each sub goal 63. Consequently, when the normal action is selected, the mobile control unit 25 controls the electric motors 15 so that the autonomous mobile body 1 moves in the direction of the destination 67 while avoiding obstacles based on the repulsive force vector while following the planned path 68.

When the avoidance action is selected, the direction of the attractive vector is set to the avoidance direction 90, and the norm is set, for example, to a predetermined input speed. Consequently, when the avoidance action is selected, the mobile control unit 25 controls the electric motors 15 so as to avoid the interfering obstacle 66 within the passage 95.

Figure 12:
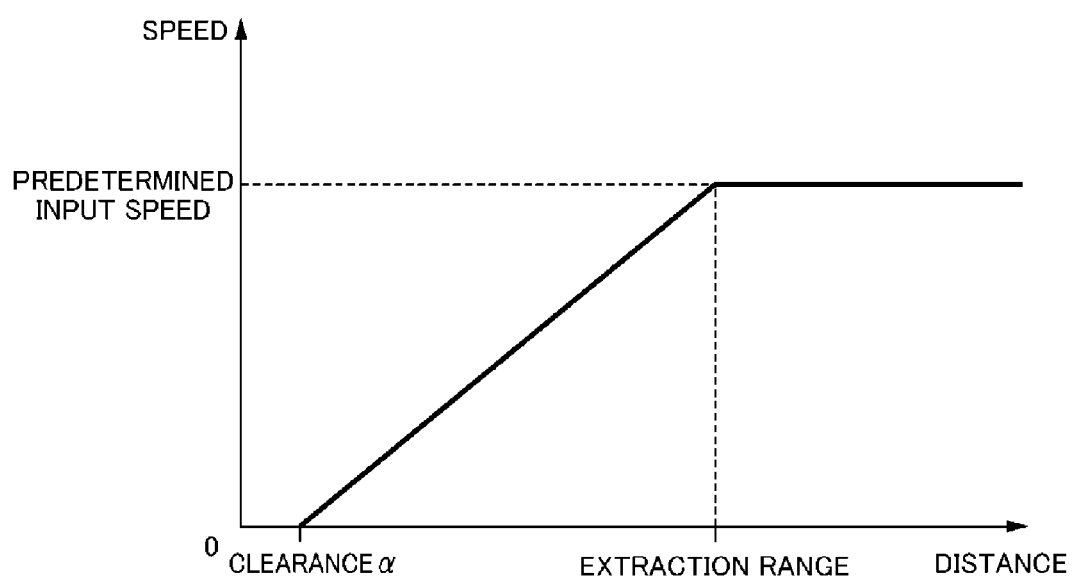
FIG. 12 is a graph showing the relation of the distance and speed up to the stop position.

When the stopping action is selected, the direction of the attractive vector is set to a pull-off direction (avoidance direction 90) which heads to the stop position 69 from the self-location 64 until reaching the stop position 69. In other words, the mobile control unit 25 controls the autonomous mobile body so that it moves toward the pull-off direction and stops at the stop position 69. Consequently, the mobile control unit 25 corresponds to the mobile controller. In addition, the norm of the attractive vector is set according to the distance between the self-location 64 and the stop position 69. FIG. 12 is a graph showing the relation between the distance and speed up to the stop position. In FIG. 12, the horizontal axis shows the distance between the self-location 64 and the stop position 69, and the vertical axis shows the norm of the attractive vector; that is, the speed during the stopping action.

As shown in FIG. 12, the norm of the attractive vector is set to a predetermined input range when the distance between the self-location 64 and the stop position 69 is over an extraction range. Note that, upon identifying the moving target direction 72, the sub goals 63 within a given range from the self-location 64 were identified, and this given range can be set as the extraction range. The norm of the attractive vector decreases as the self-location 64 approaches the stop position 69 when the distance between the self-location 64 and the stop position 69 is within an extraction range, and becomes 0 at the position where the distance between the self-location 64 and the stop position 69 approaches clearance α. Specifically, the mobile control unit 25 performs control so that the mobile speed becomes slower as the distance between the autonomous mobile body and the stop position 69 becomes shorter. Consequently, the autonomous mobile body 1 approaches the stop position 69 while decelerating, and stops when the norm reaches the value of 0. In this preferred embodiment, the clearance α is set to a value that is half the size D2 of the autonomous mobile body, or a value that is obtained by adding arbitrary clearance to a value that is half the size D2 of the autonomous mobile body.

With the virtual potential method, the resultant vector is calculated by synthesizing the attractive vector and the repulsive force vector which sets the norm (speed) of the attractive vector as the limit. Thus, as the norm becomes smaller, the leverage to avoid the obstacle will decrease, and it becomes difficult to avoid the obstacle. Thus, the electronic control device 20 includes an interference determination unit 31 arranged to perform interference determination when mobile control is performed to stop the autonomous mobile body 1.

Figure 13:
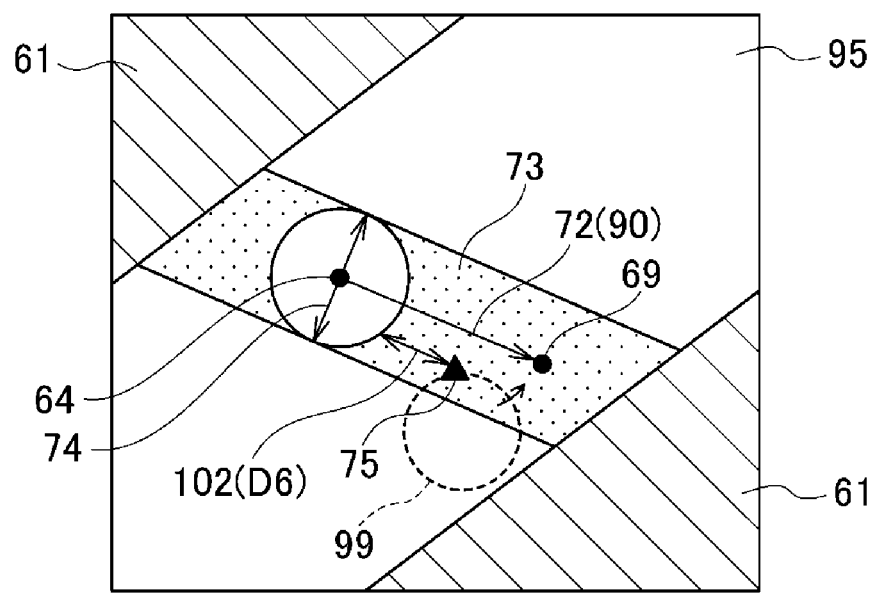
FIG. 13 is a diagram explaining the method of interference determination.

The interference determination method performed by the interference determination unit 31 is now explained with reference to FIG. 13. FIG. 13 is a diagram explaining the interference determination method. The interference determination performed by the interference determination unit 31 is performed by using the interference distance D6 calculated by the foregoing interference distance calculation unit 231.

As shown in FIG. 13, the interference distance calculation unit 231 sets the interference zone 73 as described above. The interference zone 73 is a strip-shaped region extending parallel or substantially parallel to the moving target direction 72, and the size 74 of the width direction that is perpendicular or substantially perpendicular to the moving target direction 72 is set to the size obtained by adding clearance to the size D2 of the autonomous mobile body or the size D2 of the autonomous mobile body. Moreover, the interference zone 73 is set so that the self-location 64 is position at the center in the width direction. Note that, as the moving target direction 72, the pull-off direction (avoidance direction 90) from the self-location 64 to the stop position 69 is set.

In addition, the interference distance calculation unit 231 identifies, among the obstacle points 65 identified by the obstacle information, the interfering point 75 positioned in the interference zone 72 located in front of the self-location 64. FIG. 13 shows a state where an as-yet-unknown obstacle 99 is entering in the interference zone 73. The interference distance calculation unit 231 calculates the distance 102 along the moving target direction 72 from the identified interfering point 75 up to the autonomous mobile body 1. When a plurality of interfering points 75 are set, the distance 102 of each of such interfering points 75 is calculated. In addition, the interference distance calculation unit 231 sets the shortest distance among the calculated distances 102 as the interference distance D6.

The interference determination unit 31 estimates the stopping distance required for the autonomous mobile body to stop. In addition, the interference determination unit 31 determines that the autonomous mobile body will interfere with the interfering obstacle 66, unless it stops, when the interference distance D6 is less than the distance obtained by adding the clearance value to the stopping distance. In the foregoing case, the interference determination unit 31 determines that the autonomous mobile body is to be stopped. Moreover, the interference determination unit 31 determines that the autonomous mobile body will not interfere with the interfering obstacle 66 even upon moving forward without stopping when the interference distance D6 is equal to or larger than the distance obtained by adding the clearance value to the stopping distance. In the foregoing case, the interference determination unit 31 determines that the autonomous mobile body is not to be stopped. In other words, the interference determination unit 31 corresponds to the estimation unit and the determination unit. The stopping distance is the distance that the autonomous mobile body will move from the time that the control to stop the mobile control unit 25 is started to the time that the autonomous mobile body actually stops. In this preferred embodiment, the stopping distance is estimated based on the formula of (current speed)×(time required for deceleration)/2. Moreover, as the distance obtained by adding the clearance value to the stopping distance, the distance shown with the formula of (current speed)×(time required for deceleration)+β may also be used. β is a distance that corresponds to the clearance with additional safety.

When the interference determination unit 31 determines that the autonomous mobile body is to be stopped, the vector calculation unit 251 sets the norm of the attractive vector to 0, and controls the autonomous mobile body 1 so that it will stop. Moreover, the mobile control unit 25 continues the control of moving the autonomous mobile body to the stop position 69 when it is determined by the interference determination unit 31 that the autonomous mobile body is not to be stopped while it is heading toward the stop position 69.

Moreover, even when the retreat action is selected, the mobile control unit 25 controls the autonomous mobile body 1 to move to and stop at the stop position, and thereafter controls it to retreat to the standby position 71 or the detour route. In other words, the mobile control unit 25 controls the autonomous mobile body 1 to perform the retreat action after performing the foregoing stopping action when the retreat action is selected. Thus, the stop position setting unit 29 sets the stop position 69 even when the retreat action is selected.

When the standby action is selected as the retreat action, the mobile control unit 25 controls the autonomous mobile body 1 to stand by for a predetermined time after retreating from the stop position 69 to the standby position 71, and thereafter once again return to the original passage 95. In addition, the mobile control unit 25 controls the movement of the autonomous mobile body 1 once again along the original path 68. When the detour action is selected as the retreat action, the mobile control unit 25 controls the autonomous mobile body 1 to move from the stop position 69 to the detour route, and move to the destination 67 through the detour route.

Figure 14:
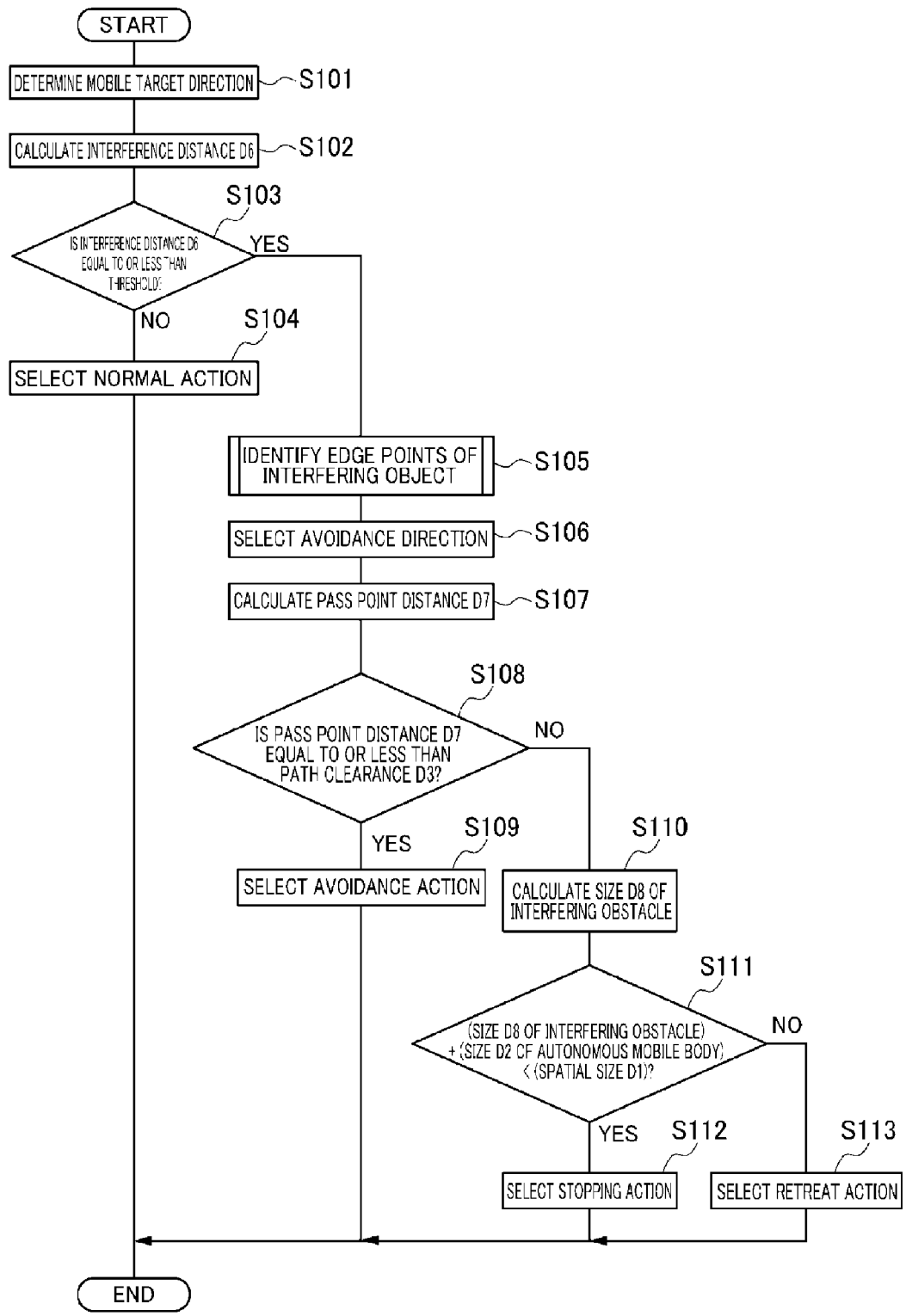
FIG. 14 is a flowchart showing the processing routine of the action selection processing.

Next, the processing routine of the mobile control performed by the electronic control device 20 is explained, and the operation of the autonomous mobile body 1 is also explained. Foremost, the processing routine of the action selection processing performed by the autonomous mobile body is explained with reference to FIG. 14. FIG. 14 is a flowchart showing the processing routine of the action selection processing. The action selection processing is executed at a predetermined cycle when the autonomous mobile body 1 is autonomously moving toward the destination 67.

Foremost, in step S101, the moving target direction 72 is determined based on the self-location 64 and the position of the plurality of sub goals 63 located in front of the self-location 64 (FIG. 5A). Note that, prior to the foregoing process, the estimation of the self-location 64 on the environmental map and the identification of the obstacle points 65 indicating the obstacles around the autonomous mobile body on the environmental map are performed. Subsequently, in step S102, the interference zone 73 parallel or substantially parallel to the moving target direction 72 is set, and the distance between the nearest neighbor interfering point 79 closest to the autonomous mobile body among the interfering points 75 in the interference zone 73 and the autonomous mobile body 1; that is, the interference distance D6 is calculated (FIG. 5B, FIG. 5C).

In subsequent step S103, whether or not the interference distance D6 calculated in step S102 is equal to or less than a threshold is determined. Consequently, whether an interfering obstacle 66 exists in front of the autonomous mobile body 1 is determined. When the interference distance D6 is determined to be larger than the threshold in step S103, the processing proceeds to step S104. In step S104, the normal action is selected. When the normal action is selected, the autonomous mobile body 1 moves within the passage 95 in the moving target direction 72 based on the control of the mobile control unit 25.

Figure 15:
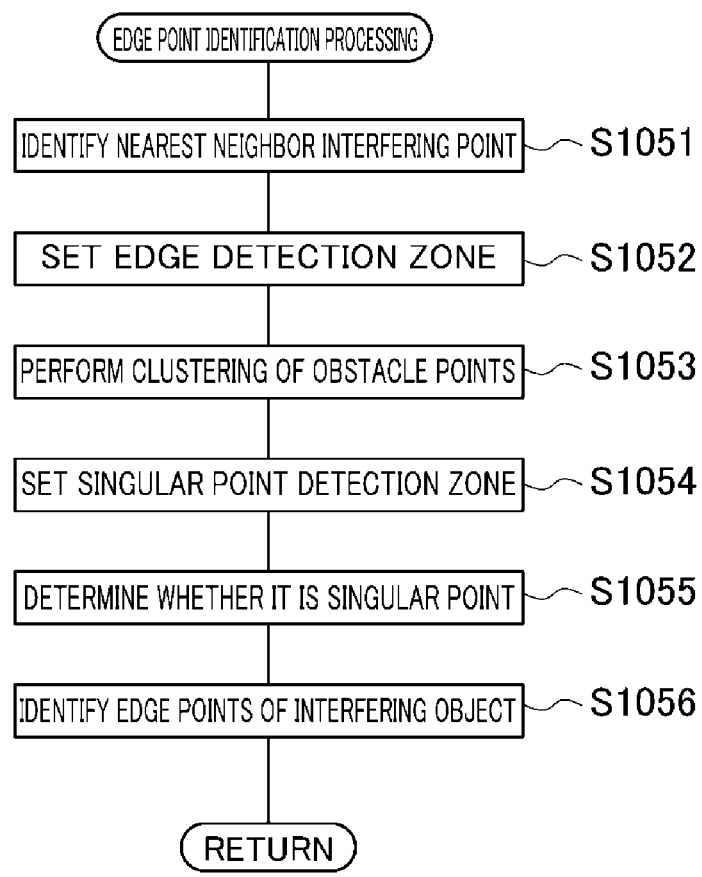
FIG. 15 is a flowchart showing the processing routine of the edge points identification processing.

When the interference distance D6 is determined to be equal to or less than the threshold in step S103, the processing proceeds to step S105. In step S105, the edge points 86 of the interfering obstacle 66 are identified. The processing routine of the processing for identifying the edge points is now explained with reference to FIG. 15. FIG. 15 is a flowchart showing the processing routine of the identification processing of the edge points 86.

In the edge point identification processing, foremost, in step S1051, the nearest neighbor interfering point 79 which may interfere with, and is closest to, the autonomous mobile body 1 among the interfering points 75 is identified (FIG. 5C). Subsequently, in step S1052, the edge detection zone 80 containing the nearest neighbor interfering point 79 and extending in a direction that is perpendicular or substantially perpendicular to the moving target direction 72 is set (FIG. 6A). Subsequent, in step S1053, the obstacle points 82 contained in the edge detection zone 80 are identified. In other words, the obstacle points 82 that can be deemed a cluster are clustered (FIG. 6A). When the obstacle point 83 adjacent to the obstacle points 82 identified as being contained in the edge detection zone 80 is not included in the edge detection zone 80, in step S1054, the singular point detection zone 84 extending parallel or substantially parallel to the moving target direction 72 is set (FIG. 6B).

In subsequent step S1055, whether the obstacle point 83 is a singular point is determined based on whether the obstacle point 65 exists in the overlapping region 85 (cross-hatched region in FIG. 6B) of the edge detection zone 80 and the singular point detection zone 84. Subsequently, when the obstacle point is a singular point, clustering is performed including the obstacle point 65 existing in the region 85. Subsequently, in step S1056, among the clustered obstacle points 65, the two obstacle points that are most separated in a direction that is perpendicular or substantially perpendicular to the moving target direction 72 are identified as the edge points 86 (FIG. 6B). The two edge points 86 are identified with the foregoing processing. The processing thereafter proceeds to step S106 of FIG. 14.

In step S106, the avoidance direction 90 is selected in order to avoid the interfering obstacle 66 (FIG. 7A, FIG. 7B). Subsequently, in step S107, the pass point distance D7 as the shortest distance between the avoidance pass point 91, which is passed through upon avoiding the interfering obstacle 66, and the path 68, is calculated (FIG. 7C).

In step S108, whether the pass point distance D7 between the avoidance pass point 91 and the path 68 is equal to or less than the path clearance D3 is determined. Consequently, it is determined whether the interfering obstacle 66 can be avoided within the passage 95. In step S108, if the pass point distance D7 is equal to or less than the path clearance D3, it is determined that the avoidance action is possible and the processing proceeds to step S109. In step S109, the avoidance action is selected. When the avoidance action is selected, based on the control of the mobile control unit 25, the autonomous mobile body 1 moves toward the avoidance direction 90 in order to avoid the interfering obstacle 66 within the passage 95.

In step S108, when the pass point distance D7 is larger than the path clearance D3, it is determined that the avoidance action is not possible and the processing proceeds to step S110. In step S110, the size D8 of the interfering obstacle 66 in a direction that is perpendicular or substantially perpendicular to the moving target direction 72 is calculated. In subsequent step S111, whether the total value of the size D8 of the interfering obstacle 66 and the size D2 of the autonomous mobile body is smaller than the spatial size D1 is determined. Consequently, whether it is possible for the interfering obstacle 66 and the autonomous mobile body to pass each other within the passage 95 including the planned path is determined.

In step S111, when the total value of the size D8 of the interfering obstacle 66 and the size D2 of the autonomous mobile body is smaller than the spatial size D1, the processing proceeds to step S112. In step S112, the stopping action is selected. In step S111, when the total value of the size D8 of the interfering obstacle 66 and the size D2 of the autonomous mobile body is equal to or larger than the spatial size D1, the autonomous mobile body 1 determines that it is not possible to pass by the interfering obstacle 66, and the processing proceeds to step S113. In step S113, the retreat action is selected.

Figure 16:
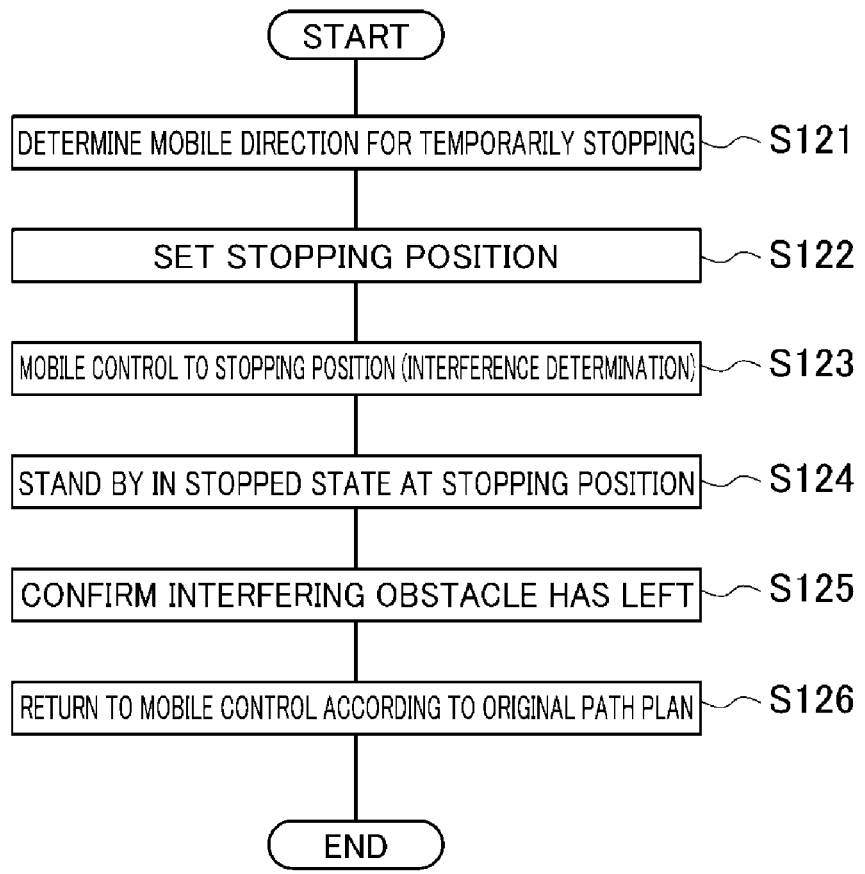
FIG. 16 is a flowchart showing the processing routine of the mobile control processing during the stopping action (movement to a pull-off direction).

Subsequently, the processing routine of the mobile control processing when the stopping action is selected is now explained with reference to FIG. 16. FIG. 16 is a flowchart showing the processing routine of the mobile control processing during the stopping action. Note that the action selection processing shown in FIG. 14 is performed at a predetermined cycle even during the control of moving the autonomous mobile body toward the stop position 69.

Foremost, in step S121, the pull-off direction in which the autonomous mobile body is to move for temporarily stopping is determined (FIG. 10). In this preferred embodiment, the avoidance direction 90 is selected as the pull-off direction in which the autonomous mobile body is to move. Subsequently, in step S122, the stop position 69 is set at the edge of the passage 95. In step S123, mobile control of moving the autonomous mobile body toward the stop position 69 is started. The interference determination is executed during the mobile control of moving the autonomous mobile body toward the stop position 69, and, when it is determined that the autonomous mobile body is likely to interfere with an as-yet-unknown obstacle, the autonomous mobile body is controlled to stop even if it has not yet reached the stop position 69.

In step S124, the autonomous mobile body 1 is controlled to stand by for a predetermined time at the stop position 69. Thereafter, in step S125, when it is confirmed that the interfering obstacle 66 has left based on the obstacle information, in step S126, the process returns to the mobile control based on the original planned path 68. Since the autonomous mobile body 1 moves to and stops at the edge of the passage 95 based on the foregoing processing, the autonomous mobile body 1 can make way for the interfering obstacle 66. Thus, if the interfering obstacle 66 is a person, that person can move forward without concern or stress. Subsequently, when the interfering obstacle 66 has left, the autonomous mobile body 1 resumes its travel along the original path 68.

Figure 17:
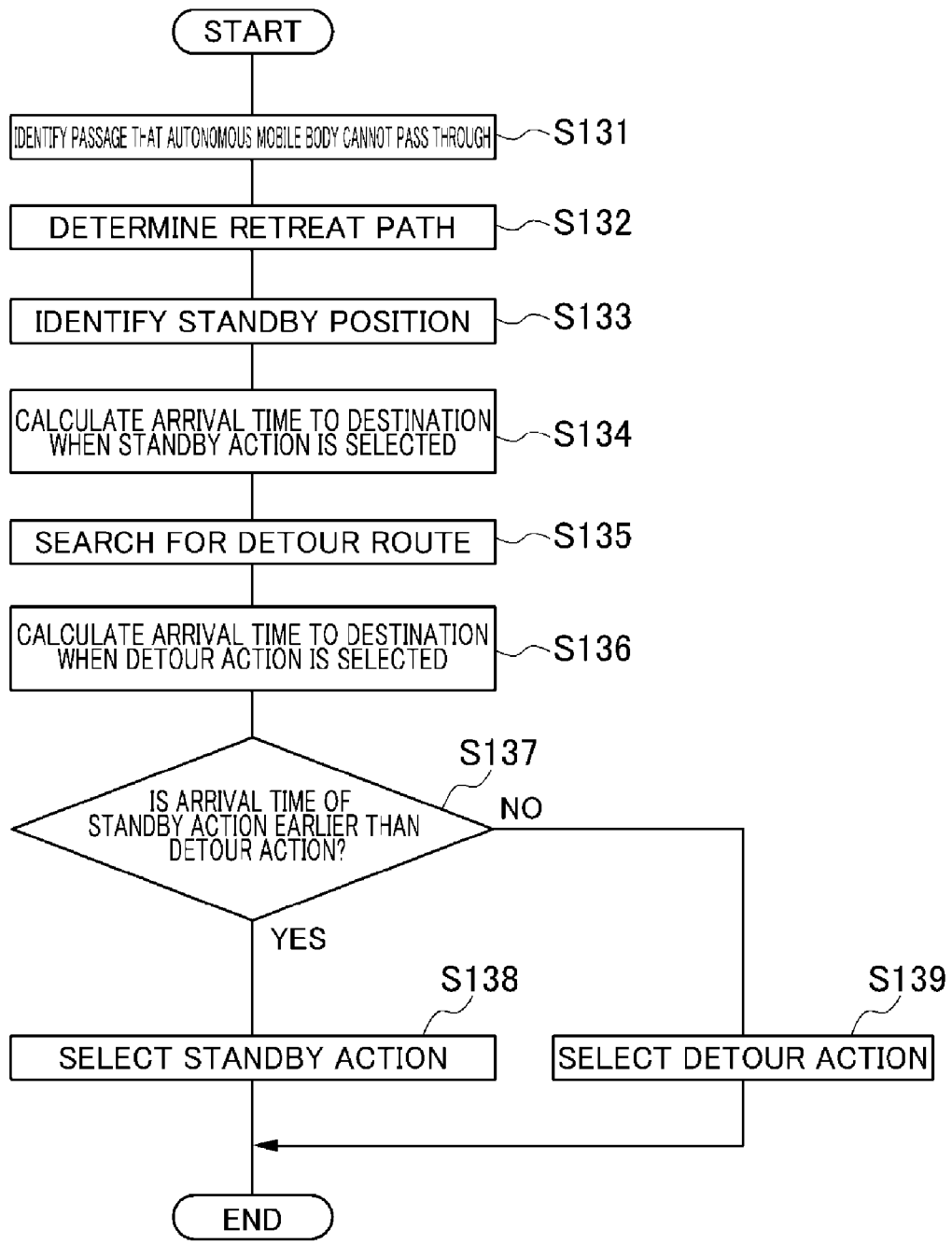
FIG. 17 is a flowchart showing the processing routine of the selection processing of the standby action and the detour action.

The processing routine of the action selection processing of selecting the action of either the standby action or the detour action of the retreat action is now explained with reference to FIG. 17. FIG. 17 is a flowchart showing the processing routine of the selection processing of the standby action and the detour action.

In step S131, an impassable passage is identified by using the position of the interfering obstacle 66 based on the obstacle point 65 and the size D8 of the interfering obstacle 66. Subsequently, in step S132, the retreat path 70 including the path clearance D3 where the standby position 71 can be set is identified. Subsequently, in step S133, the standby position 71 is set on the retreat path 70. In subsequent step S134, a path is planned from the self-location 64 to the standby position 71, and the arrival time to the destination when the standby action is selected is calculated.

Moreover, in step S135, the detour route 97 for taking a detour from the path where the interfering obstacle 66 exists is searched. Subsequently, in step S136, the arrival time to the destination when the detour action is selected is calculated. Subsequently, in step S137, whether the arrival time to the destination based on the standby action is faster than the detour action is determined.

In step S137, when the arrival time based on the standby action is faster than the detour action, the processing proceeds to step S138. In step S138, the standby action is selected. In step S137, when the arrival time based on the standby action is slower than the detour action, or when the arrival time based on the standby action is the same as the detour action, the processing proceeds to step S139. In step S139, the detour action is selected.

Figure 18:
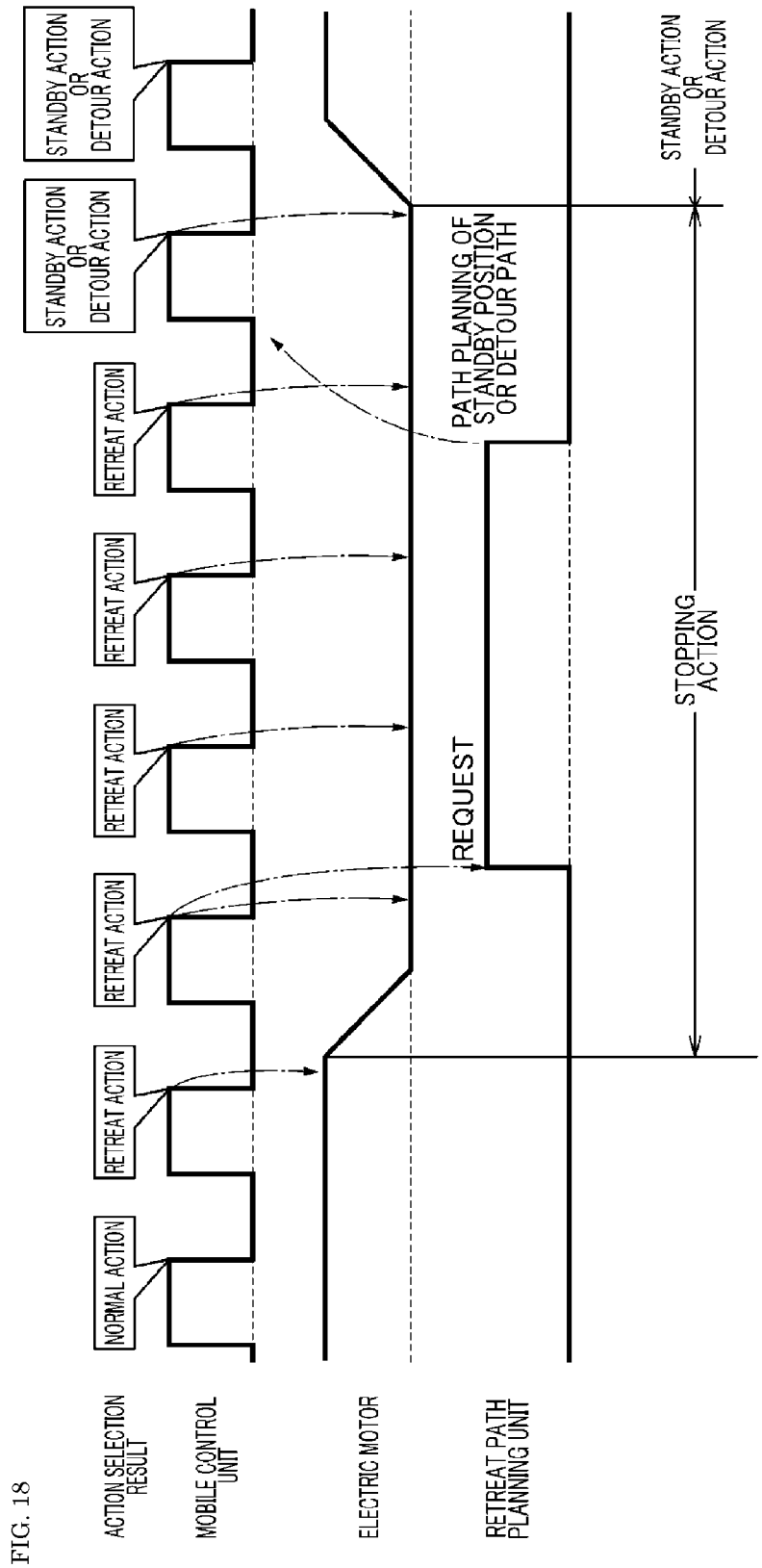
FIG. 18 is a timing chart showing the operation when the retreat action is selected.

The movement of the autonomous mobile body 1 from the time that the retreat action is selected up to the time of perform the standby action or the detour action is now explained with reference to FIG. 18. FIG. 18 is a timing chart showing the operation in the case where the retreat action is selected.

The action selection unit 24 selects the action at a predetermined cycle. The mobile control unit 25 controls the electric motors 15 based on the selecting result by the action selection unit 24, and the timing. As shown in the example of FIG. 18, when the retreat action is selected from a state where the normal action had been selected, the mobile control unit 25 controls the electric motors 15 to start the stopping action. The stop position 69 is set by the stop position setting unit 29, and the electric motors 15 are controlled so that the autonomous mobile body 1 moves toward the stop position 69 while decelerating, and then stops at the stop position 69.

When the retreat action is sequentially selected once again, the action selection unit 24 requests the retreat path planning unit 30 to perform the path planning up to the standby position and the path planning of the detour route 97. Subsequently, the retreat path plan 30 performs the path planning up to the standby position and the path planning of the detour route. While the foregoing path planning is being performed, if the retreat action is continuously selected by the action selection unit 24, the autonomous mobile body 1 is controlled to be in a stopped state at the stop position 69. For example, while the path planning is being performed, when the interfering obstacle 66 as a person or the like avoids and passes by the autonomous mobile body 1 and the autonomous mobile body 1 is thus able to move once again along the original planned path 68, the normal action is selected. In the foregoing case, the processing returns to the original path plan.

When the path planning up to the standby position and the path planning of the detour route 97 are output by the retreat path planning unit 30, the arrival time to the respective destinations 67 is calculated, and the standby action or the detour action is selected based on the calculated arrival time. Subsequently, the selected retreat action is performed. Note that, if a detour route does not exist as a result of searching for the detour route 97 in step S135 of FIG. 17, the standby action is selected in step S137. Moreover, when the retreat path 71 was not determined in step S132 of FIG. 17, since this means that the retreat path 71 and the detour route 97 do not exist, the stopping action is selected. Subsequently, after stopping, for example, an error display is displayed on the display of the autonomous mobile body 1 or an error message is reproduced.

When the detour action is selected, the electric motors 15 are controlled to move the autonomous mobile body 1 to the destination 67 through the planned detour route 97. When the standby action is selected, the electric motors 15 are controlled so that the autonomous mobile body 1 moves, while decelerating, toward the standby position 71, and then stop at the standby position 71. Subsequently, after the lapse of a predetermined time in a state of being stopped at the standby position 71, the electric motors 15 are controlled to move the autonomous mobile body 1 to return to the original passage 95 and move along the original planned path.

In this preferred embodiment, the retreat action is not carried out when the retreat action is selected only once, and control is performed so that the processing proceeds to the retreat action only when the retreat action is selected continuously a plurality of times. Thus, it is possible to prevent the retreat action from being executed when the retreat action is erroneously selected by sensor noise or like, even though it is possible to move forward.

Moreover, even when the retreat action is selected, the action of making way can be performed by performing the stopping action. In addition, since the processing of selecting the action is also performed while the autonomous mobile body 1 is stopped, it is possible to determine the movement of the interfering obstacle 66 during the action of making way, and select to return to the original passage 95 or perform the retreat action according to the situation. Consequently, it is possible to alleviate the concern and stress of the person facing the autonomous mobile body 1, and the autonomous mobile body 1 can reach the destination in the minimal amount of time.

The autonomous mobile body 1 according to this preferred embodiment explained above identifies the edge points 86 indicating the positions of both ends of the region where the interfering obstacle 66 exists, and sets and moves to the pull-off direction based on the identified edge points 86 and the size D2 of the autonomous mobile body. Consequently, the autonomous mobile body 1 can independently set a direction that the autonomous mobile body 1 can pull off without interfering with the interfering obstacle 66, and move in the set direction. When the autonomous mobile body 1 moves in this pull-off direction, this causes the autonomous mobile body 1 to make way for the interfering obstacle 66, and the interfering obstacle 66 can thereby move forward safely. In other words, the autonomous mobile body 1 can independently set and move in the pull-off direction, without having to set a halt region in advance, so that the movable obstacle can pass through safely.

The autonomous mobile body 1 according to the present preferred embodiment preferably sets the stop position 69 based on the pull-off direction and the environmental map, and moves to and stops at the stop position 69. Consequently, the autonomous mobile body 1 can independently set the stop position 69 at a position that is environmentally suitable; that is, at a position that will not interfere with peripheral obstacles. Accordingly, the autonomous mobile body 1 makes way for the obstacle 66 in the moving target direction, and is able to wait for the interfering obstacle 66 to pass through at the position according to the situation.

Moreover, the autonomous mobile body 1 can safely stop since it performs mobile control so that the mobile speed of the autonomous mobile body becomes slower as it approaches the stop position 69. Moreover, since it will be easier to know that the autonomous mobile body 1 will stop when viewed from the outside, the interfering obstacle 66 such as a person can pass by the autonomous mobile body at ease.

In addition, by performing the interference determination upon moving toward the stop position 69, the autonomous mobile body 1 stops when the distance between the autonomous mobile body and the obstacle is less than the distance calculated by adding the clearance value to the stopping distance. Accordingly, while the leverage to avoid the obstacle by the virtual potential method will decrease when the speed of the autonomous mobile body is decreased while moving in the pull-off direction, as a result of performing the interference determination, it is possible to reliably stop when an obstacle appears in the pull-off direction.

Furthermore, the autonomous mobile body 1 determines whether the avoidance action within the passage 95 is possible and performs the avoidance action when the avoidance action is possible, and moves in the pull-off direction when the avoidance action is not possible. Accordingly, since the autonomous mobile body 1 performs the avoidance action, if the avoidance action is possible, when there is an interfering obstacle 66, the autonomous mobile body 1 can head toward the destination efficiently.

The autonomous mobile body 1 determines that the avoidance action is possible when the pass point distance D7 is larger than the path clearance D3, and determines that the avoidance action is not possible when the pass point distance D7 is equal to or less than the path clearance D3. Consequently, the autonomous mobile body 1 determines that the avoidance action is possible when the clearance used to move to the pass point 91 to avoid the interfering obstacle 66 is within the passage 95, and determines that the avoidance action is not possible when the foregoing clearance is not within the passage 95. Accordingly, the autonomous mobile body can appropriately and creatively use the avoidance action and the action for pulling off and making way according to the situation.

When performing mobile control using the virtual potential method, in situations where it is not possible to avoid the interfering obstacle 66 within the passage 95, there are cases where the repulsive force caused by the existence of the interfering obstacle 66 and the attractive force heading toward the destination 67 may be balanced. In the foregoing case, the autonomous mobile body repeatedly moves forward and backward in front of the interfering obstacle 66 upon performing the obstacle avoidance based on the virtual potential method without performing the foregoing selection processing of the avoidance action and the stopping action. Meanwhile, since the autonomous mobile body 1 according to this preferred embodiment selects the avoidance action or the stopping action according to the situation, when it is determined that the avoidance action cannot be performed, the stopping action is performed without performing the avoidance action. Accordingly, in mobile control using the virtual potential method, it is possible to prevent the action of the autonomous mobile body 1 repeatedly moving forward and backward in front of the interfering obstacle 66.

Furthermore, since the autonomous mobile body 1 stands by for a predetermined time after the autonomous mobile body reaches the stop position 69, it is possible to create a situation where the interfering obstacle 66 can pass through the passage 95, and wait for the obstacle to pass through. In addition, since the autonomous mobile body 1 resumes its movement along the original path 68 after waiting for a predetermined time, the autonomous mobile body 1 can reach the destination efficiently.

Preferred embodiments of the present invention were explained above, but the present invention is not limited to the foregoing preferred embodiments and may be variously modified. For example, while the autonomous mobile body 1 of the foregoing preferred embodiment preferably was a robot including a columnar main body 11 and omni wheels mounted at the lower region of the main body 11, the shape of the main body 11 and the elements that achieve mobility are not limited thereto.

Moreover, in the foregoing preferred embodiment, while the stop position setting unit 29 preferably sets the stop position 69 within the passage 95, the stop position may also be set within a passage that intersects with the passage 95.

Moreover, in the foregoing preferred embodiment, while the autonomous mobile body 1 preferably pulls off toward the stop position 69 (pull-off direction) when the stopping action is selected, the autonomous mobile body 1 can also discontinue its movement in the pull-off direction and start the avoidance action when it becomes possible to perform the avoidance action while moving in the pull-off direction. Accordingly, even after the autonomous mobile body 1 starts moving in the pull-off direction, if the situation changes and it becomes possible to perform the avoidance action, it is possible to start the avoidance action according to such change in situation.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. An autonomous mobile body which autonomously moves along a planned path, the autonomous mobile body comprising:
   a storage unit arranged to store a size of the autonomous mobile body;
   an obstacle information acquisition unit arranged to acquire obstacle information of obstacles around the autonomous mobile body;
   an obstacle identification unit arranged to identify, based on the obstacle information acquired by the obstacle information acquisition unit, positions of both ends of a region in which an obstacle positioned in a moving target direction exists, the both ends being both ends on a plane parallel or substantially parallel to a passage plane in a direction which is perpendicular or substantially perpendicular to the moving target direction;
   a direction setting unit arranged to set a pull-off direction based on the size of the autonomous mobile body stored in the storage unit and the positions of the both ends identified by the obstacle identification unit;
   a mobile controller arranged and programmed to control the autonomous mobile body to move in the pull-off direction set by the direction setting unit; and
   a stop position setting unit arranged to set a stop position in the pull-off direction based on a pull-off direction set by the direction setting unit, and an environmental map, wherein the mobile controller controls the autonomous mobile body to move to and stop at the stop position set by the stop position setting unit.

2. The autonomous mobile body according to claim 1, wherein the mobile controller controls the autonomous mobile body so that a speed of the autonomous mobile body becomes slower as a distance between the autonomous mobile body and the stop position becomes shorter.

3. The autonomous mobile body according to claim 2, further comprising:
   an interference distance calculation unit arranged to calculate an interference distance between the obstacle positioned in the pull-off direction and the autonomous mobile body based on the obstacle information, while the autonomous mobile body is moving to the pull-off direction;
   an estimation unit arranged to estimate a stopping distance required for the autonomous mobile body to stop; and
   a determination unit arranged to determine whether the autonomous mobile body is to be stopped based on the interference distance calculated by the calculation unit and the stopping distance estimated by the estimation unit; wherein
   wherein the mobile controller stops the autonomous mobile body when the determination unit determines that the autonomous mobile body is to be stopped, and continues the control to move the autonomous mobile body to the pull-off direction when the determination unit determines that the autonomous mobile body is not to be stopped.

4. The autonomous mobile body according to claim 3, wherein the determination unit determines that the autonomous mobile body is to be stopped when the interference distance is less than a distance obtained by adding a clearance value to the stopping distance, and determines that the autonomous mobile body is not to be stopped when the interference distance is equal to or larger than the distance obtained by adding the clearance value to the stopping distance.

5. The autonomous mobile body according to claim 4, further comprising an avoidance determination unit arranged to determine whether an avoidance action of the autonomous mobile body moving forward while avoiding an obstacle positioned in the moving target direction based on the obstacle information, is possible on a passage which is a region where the planned path is set and the autonomous mobile body can move, wherein the mobile controller controls the autonomous mobile body to perform the avoidance action when the avoidance determination unit determines that the avoidance action is possible, and controls the autonomous mobile body to move in the pull-off direction when the avoidance determination unit determines that the avoidance action is not possible.

6. The autonomous mobile body according to claim 5, further comprising:
   a pass point distance calculation unit arranged to calculate a distance between the planned path and a pass point within the passage that has been set to avoid interference with the obstacle existing in the moving target direction; and
   a clearance identification unit arranged to identify a path clearance within the passage that is a distance that the autonomous mobile body can move from the planned path to a direction which is on the pass point side and which is perpendicular or substantially perpendicular to the path direction; wherein
   the avoidance determination unit determines that the avoidance action is possible when the distance calculated by the pass point distance calculation unit is larger than the path clearance identified by the clearance identification unit, and determines that the avoidance action is not possible when the distance calculated by the pass point distance calculation unit is equal to or less than the path clearance identified by the clearance identification unit.

7. The autonomous mobile body according to claim 6, wherein the mobile controller stops the movement of the autonomous mobile body to the pull-off direction and causes the autonomous mobile body to perform the avoidance action when the avoidance determination unit determines that the avoidance action is possible while the autonomous mobile body is moving to the pull-off direction.

8. The autonomous mobile body according to claim 2, wherein the mobile controller controls the autonomous mobile body to standby for a predetermined time after reaching the stop position, and thereafter to once again move along the planned path.

9. The autonomous mobile body according to claim 1, wherein the mobile controller controls the autonomous mobile body to standby for a predetermined time after reaching the stop position, and thereafter to once again move along the planned path.

10. The autonomous mobile body according to claim 1, further comprising:
    an interference distance calculation unit arranged to calculate an interference distance between the obstacle positioned in the pull-off direction and the autonomous mobile body based on the obstacle information, while the autonomous mobile body is moving to the pull-off direction;
    an estimation unit arranged to estimate a stopping distance required for the autonomous mobile body to stop; and
    a determination unit arranged to determine whether the autonomous mobile body is to be stopped based on the interference distance calculated by the calculation unit and the stopping distance estimated by the estimation unit; wherein
    the mobile controller stops the autonomous mobile body when the determination unit determines that the autonomous mobile body is to be stopped, and continues the control to move the autonomous mobile body to the pull-off direction when the determination unit determines that the autonomous mobile body is not to be stopped.

11. The autonomous mobile body according to claim 10, wherein the determination unit determines that the autonomous mobile body is to be stopped when the interference distance is less than a distance obtained by adding a clearance value to the stopping distance, and determines that the autonomous mobile body is not to be stopped when the interference distance is equal to or larger than the distance obtained by adding the clearance value to the stopping distance.

12. The autonomous mobile body according to claim 11, further comprising an avoidance determination unit arranged to determine whether an avoidance action of the autonomous mobile body moving forward while avoiding an obstacle positioned in the moving target direction based on the obstacle information is possible, on a passage which is a region where the planned path is set and the autonomous mobile body can move, wherein the mobile controller controls the autonomous mobile body to perform the avoidance action when the avoidance determination unit determines that the avoidance action is possible, and controls the autonomous mobile body to move in the pull-off direction when the avoidance determination unit determines that the avoidance action is not possible.

13. The autonomous mobile body according to claim 12, further comprising:
    a pass point distance calculation unit arranged to calculate a distance between the planned path and a pass point within the passage that has been set to avoid interference with the obstacle existing in the moving target direction; and
    a clearance identification unit arranged to identify a path clearance within the passage that is a distance that the autonomous mobile body can move from the planned path to a direction which is on the pass point side and which is perpendicular or substantially perpendicular to the path direction; wherein
    the clearance determination unit determines that the clearance action is possible when the distance calculated by the pass point distance calculation unit is larger than the path clearance identified by the clearance identification unit, and determines that the clearance action is not possible when the distance calculated by the pass point distance calculation unit is equal to or less than the path clearance identified by the clearance identification unit.

14. The autonomous mobile body according to claim 13, wherein the mobile controller stops the movement of the autonomous mobile body to the pull-off direction and causes the autonomous mobile body to perform the avoidance action when the avoidance determination unit determines that the avoidance action is possible while the autonomous mobile body is moving to the pull-off direction.

15. An autonomous mobile body which autonomously moves along a planned path, the autonomous mobile body comprising:
    a storage unit arranged to store a size of the autonomous mobile body;
    an obstacle information acquisition unit arranged to acquire obstacle information of obstacles around the autonomous mobile body;
    an obstacle identification unit arranged to identify, based on the obstacle information acquired by the obstacle information acquisition unit, positions of both ends of a region in which an obstacle positioned in a moving target direction exists, the both ends being both ends on a plane parallel or substantially parallel to a passage plane in a direction which is perpendicular or substantially perpendicular to the moving target direction;
    a direction setting unit arranged to set a pull-off direction based on the size of the autonomous mobile body stored in the storage unit and the positions of the both ends identified by the obstacle identification unit;

a mobile controller arranged and programmed to control the autonomous mobile body to move in the pull-off direction set by the direction setting unit;

an interference distance calculation unit arranged to calculate an interference distance between the obstacle positioned in the pull-off direction and the autonomous mobile body based on the obstacle information, while the autonomous mobile body is moving to the pull-off direction;

an estimation unit arranged to estimate a stopping distance required for the autonomous mobile body to stop; and a determination unit arranged to determine whether the autonomous mobile body is to be stopped based on the interference distance calculated by the calculation unit and the stopping distance estimated by the estimation unit; wherein the mobile controller stops the autonomous mobile body when the determination unit determines that the autonomous mobile body is to be stopped, and continues the control to move the autonomous mobile body to the pull-off direction when the determination unit determines that the autonomous mobile body is not to be stopped.

16. The autonomous mobile body according to claim 15, wherein the determination unit determines that the autonomous mobile body is to be stopped when the interference distance is less than a distance obtained by adding a clearance value to the stopping distance, and determines that the autonomous mobile body is not to be stopped when the interference distance is equal to or larger than the distance obtained by adding the clearance value to the stopping distance.

17. An autonomous mobile body which autonomously moves along a planned path, the autonomous mobile body comprising:

a storage unit arranged to store a size of the autonomous mobile body;

an obstacle information acquisition unit arranged to acquire obstacle information of obstacles around the autonomous mobile body;

an obstacle identification unit arranged to identify, based on the obstacle information acquired by the obstacle information acquisition unit, positions of both ends of a region in which an obstacle positioned in a moving target direction exists, the both ends being both ends on a plane parallel or substantially parallel to a passage plane in a direction which is perpendicular or substantially perpendicular to the moving target direction;

a direction setting unit arranged to set a pull-off direction based on the size of the autonomous mobile body stored in the storage unit and the positions of the both ends identified by the obstacle identification unit;

a mobile controller arranged and programmed to control the autonomous mobile body to move in the pull-off direction set by the direction setting unit; and an avoidance determination unit arranged to determine whether an avoidance action of the autonomous mobile body moving forward while avoiding an obstacle positioned in the moving target direction, based on the obstacle information, is possible on a passage which is a region where the planned path is set and the autonomous mobile body can move, wherein the mobile controller controls the autonomous mobile body to perform the avoidance action when the avoidance determination unit determines that the avoidance action is possible, and controls the autonomous mobile body to move in the pull-off direction when the avoidance determination unit determines that the avoidance action is not possible.

18. The autonomous mobile body according to claim 17, further comprising:

a pass point distance calculation unit arranged to calculate a distance between the planned path and a pass point within the passage that has been set to avoid interference with the obstacle existing in the moving target direction; and a clearance identification unit arranged to identify a path clearance within the passage that is a distance that the autonomous mobile body can move from the planned path to a direction which is on the pass point side and which is perpendicular or substantially perpendicular to the path direction; wherein the avoidance determination unit determines that the avoidance action is possible when the distance calculated by the pass point distance calculation unit is larger than the path clearance identified by the clearance identification unit, and determines that the avoidance action is not possible when the distance calculated by the pass point distance calculation unit is equal to or less than the path clearance identified by the clearance identification unit.

19. The autonomous mobile body according to claim 17, wherein the mobile controller stops the movement of the autonomous mobile body to the pull-off direction and causes the autonomous mobile body to perform the avoidance action when the avoidance determination unit determines that the avoidance action is possible while the autonomous mobile body is moving to the pull-off direction.

* * * * *